(12) United States Patent
Pognant

(10) Patent No.: US 11,528,158 B2
(45) Date of Patent: Dec. 13, 2022

(54) METHOD FOR CONFIGURING, MONITORING OR SUPERVISING A HOME AUTOMATION EQUIPMENT

(71) Applicant: OVERKIZ, Metz-Tessi (FR)

(72) Inventor: Sylvain Pognant, Seynod (FR)

(73) Assignee: OVERKIZ, Metz-Tessi (FR)

( * ) Notice: Subject to any disclaimer, the term of this patent is extended or adjusted under 35 U.S.C. 154(b) by 174 days.

(21) Appl. No.: 15/781,102

(22) PCT Filed: Nov. 25, 2016

(86) PCT No.: PCT/FR2016/053096
§ 371 (c)(1),
(2) Date: Oct. 30, 2018

(87) PCT Pub. No.: WO2017/093641
PCT Pub. Date: Jun. 8, 2017

(65) Prior Publication Data
US 2019/0058610 A1    Feb. 21, 2019

(30) Foreign Application Priority Data
Dec. 3, 2015  (FR) .................................... 15/61771

(51) Int. Cl.
*H04L 12/28* (2006.01)
*H04L 9/40* (2022.01)
*H04L 67/306* (2022.01)

(52) U.S. Cl.
CPC ...... *H04L 12/2807* (2013.01); *H04L 12/2816* (2013.01); *H04L 12/2829* (2013.01);
(Continued)

(58) Field of Classification Search
CPC ............. H04L 12/2807; H04L 12/2816; H04L 12/2829; H04L 63/101; H04L 63/104; H04L 67/306
(Continued)

(56) References Cited

U.S. PATENT DOCUMENTS 9,351,193 B2 * 5/2016 Raleigh .................. G06Q 40/12
9,986,034 B2 * 5/2018 Solis ...................... H04L 67/125
(Continued)

FOREIGN PATENT DOCUMENTS

WO       2014198782       12/2014

OTHER PUBLICATIONS

International Search Report for Application No. PCT/FR2016/053096.
Written Opinion for Application No. PCT/FR2016/053096.

*Primary Examiner* — David R Lazaro
*Assistant Examiner* — Mariegeorges A Henery
(74) *Attorney, Agent, or Firm* — Cantor Colburn LLP

(57) ABSTRACT

The present invention relates to a home automation equipment configuration method including the following steps: receiving (ELRSv14) at least one configuration message (Mcf), the at least one configuration message being related to at least one attribute for access of a user (Usr) to at least one home automation device (D) from the equipment, selecting (ELRSv15) or creating a user profile (UsrP) corresponding to the user (Usr) in question, selecting (ELRSv16) or creating an entity (RE2) representing the at least one home automation device in the event that there is no representative entity in the representative entity repository (RERf), and selecting (ELRSv17) or creating an association (A21) between the at least one user profile (UsrP) and the at least one representative entity (RE), the at least one access attribute being assigned to said association
(Continued)

(A21). The present invention also relates to a method for controlling and monitoring said equipment.

16 Claims, 12 Drawing Sheets

(52) U.S. Cl.
CPC .......... *H04L 63/101* (2013.01); *H04L 63/104* (2013.01); *H04L 67/306* (2013.01)

(58) Field of Classification Search
USPC .................................................. 709/220, 224
See application file for complete search history.

(56) References Cited

U.S. PATENT DOCUMENTS

| | | | |
|---|---|---|---|
| 2011/0071685 A1* | 3/2011 | Huneycutt ............. | G05B 15/02 700/275 |
| 2012/0158161 A1* | 6/2012 | Cohn .................... | G08B 29/02 700/90 |
| 2013/0086700 A1 | 4/2013 | Cho et al. | |
| 2014/0230018 A1 | 8/2014 | Anantharaman | |
| 2014/0282048 A1 | 9/2014 | Shapiro et al. | |
| 2015/0121470 A1* | 4/2015 | Rongo .................. | H04L 63/083 726/4 |
| 2015/0309483 A1* | 10/2015 | Lyman .................. | G05B 15/02 700/275 |
| 2015/0372833 A1* | 12/2015 | Karp .................... | H04L 12/2803 700/275 |
| 2016/0308686 A1* | 10/2016 | Vijayrao ............. | H04L 12/2809 |
| 2017/0195162 A1* | 7/2017 | Enrique Salpico ..... | G06F 21/44 |

* cited by examiner

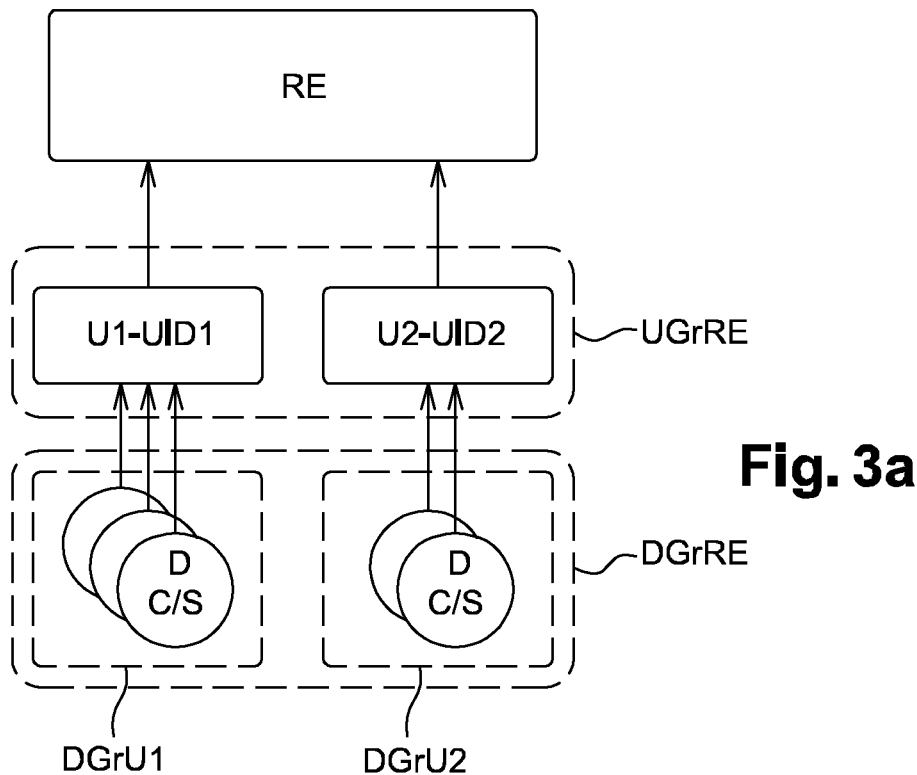
Fig. 3a
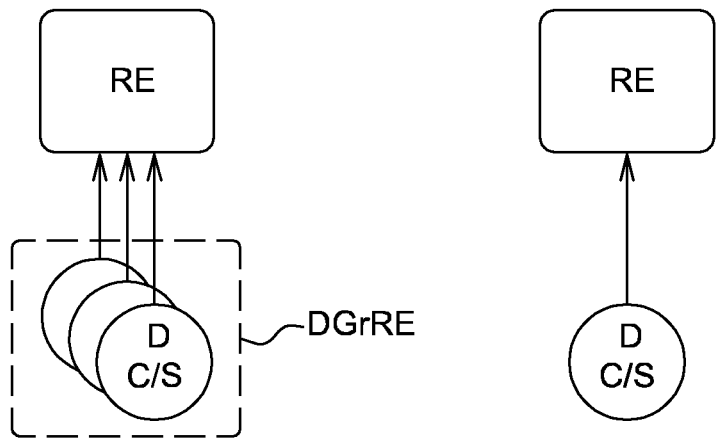
Fig. 3b  Fig. 3c

METHOD FOR CONFIGURING, MONITORING OR SUPERVISING A HOME AUTOMATION EQUIPMENT

FIELD OF THE INVENTION

The present invention concerns a configuration method and a monitoring or supervision method of a home automation installation.

PRIOR ART

A home automation installation of a building may comprise a plurality of home automation devices. It is known to proceed with the configuration, and with the monitoring, that is to say with the control and/or the supervision of said installation using a central control unit which communicates with one or several home automation device(s).

These different operations may be carried out by a main user, for example by an owner of the installation. Nonetheless, other users may also have access to the installation. In this case, it is desirable to be able to block or restrict the access to particular types of users. Known solutions consist in accessing a guest mode defined on the home automation devices, on the basis of an identification of the user by the home automation device, to determine whether he is a guest or the user holder of the account, and to consequently choose the type of operation to apply. The detection may be carried out via a user interface, biometric detectors, RFID detectors or still QR-code readers.

These arrangements result in a greater complexity and in an additional cost for the manufacture of the devices, require an intervention on each device for setting the "guest" mode, and therefore make the access setting and the administration of the latter difficult.

The present invention aims to solve all or part of the aforementioned drawbacks.

DISCLOSURE OF THE INVENTION

To this end, the present invention concerns a configuration method of a home automation installation comprising at least one home automation device and at least one central control unit, the method being executed by a management unit connected to the at least one home automation installation or by the at least one central control unit and comprising the following steps:

i. Reception of at least one configuration message from a user terminal and/or from the at least one central control unit; the at least one configuration message regarding at least one access attribute of a user to at least one home automation device of the installation;

ii. Selection of a user profile corresponding to the concerned user in a users repository; or creation of a new user profile corresponding to the concerned user in the case of an absence of a user profile in the users repository;

iii. Selection of a representative entity of the at least one home automation device in a representative entities repository; or creation of a new representative entity of the at least one home automation device in the case of an absence of a representative entity in the representative entities repository;

iv. Selection of an association between the at least one user profile and the at least one representative entity in an associations repository and update of the at least one access attribute; or creation of a new association between the at least one user profile and the at least one representative entity, the at least one access attribute being assigned to said association.

According to an aspect of the invention, after a step of creating a new user profile, the latter is saved in the users repository.

According to an aspect of the invention, after a step of creating a new representative entity, the latter is saved in the representative entities repository.

According to an aspect of the invention, after a step of creating a new association, the latter is saved in the associations repository.

In the context of the present invention, a home automation device is a home automation equipment and/or a sensor, or still a portion of a home automation equipment or a portion of a sensor corresponding to a functional subset.

In the context of the present invention, a message is an information element notified or received via a communication module from an external equipment, or in the form of a synchronous or asynchronous call, which may also correspond to a local or remote function call.

In the context of the present invention, an installation is a set comprising a plurality of home automation devices and at least one central control unit disposed on one single building or on a plurality of locations, each home automation device being related to a central control unit among the plurality of central control units, the plurality of central control units forming a group under the control of one user. The electronic devices form groups of at least one home automation device related to a central control unit.

In the context of the present invention, a central control unit of the home automation installation is an electronic unit comprising:
 at least one processing unit for containing and executing at least one computer program,
 at least one communication module intended to monitor and/or control at least one home automation device; alternatively the electronic unit may be integrated to a home automation device; and
 at least one module for communication with the management unit.

In some applications, a central control unit may communicate with the management unit through an intermediate management unit, for example a third-party service provider, whose intermediate management unit provides a service interface or API.

The central control unit may also be integrated to a router and/or a modem achieving a connection to a wide area network, in particular the Internet.

According to an aspect of the invention, the management unit is a server remotely connected to the at least one home automation installation, via a wide area network. It should be noted that the term server is a logical designation which may cover the use of several physical servers to distribute the computer processing load to be carried out.

According to another aspect of the invention, the management unit is a central unit intended to be related to one or several central control units on distinct private or local area networks, or still on the same local area network.

In the context of the present invention, a representative entity is a data structure which represents a home automation device, a group of home automation devices or an installation comprising one or several central control unit(s), this entity being intended to be associated to a user, the association formed accordingly being related to at least one access attribute.

Access attributes are defined for each association between a representative entity and a user. The access attributes may be defined either in a uniform manner for all the devices related to an association, or in a differentiated manner for the different devices, in the case where the association corresponds to several devices, using for example a list of attributes. Moreover, it is possible to define predetermined types of access attributes, for example «owner» or «guest». In this case, the configuration message does not have to contain an exhaustive list of the access attributes for each device. Only a reference to the predefined type of access rights profile «guest» may be present. Afterwards, the access attributes may be deduced from the profile type.

The arrangements according to the invention enable a connection of the devices, via one or several central control unit(s), to a management unit, in particular to a server, and a management of the operating parameters of the devices and of the filters of access to the functionalities of the devices on the management unit or on the central control unit.

Thanks to the arrangements according to the invention, it is possible to manage «multi-account» configurations, that is to say configurations in which several users have access rights defined by different access attributes in a transparent manner for the home automation devices and the central control units. Thus, during the registration of the devices, groups of devices or installations, the data structures are intended to subsequently enable «multi-account» configurations, even though each registration does not correspond to such a configuration.

Thus, devices that are not intended to detect the user type, still can operate according to different operating modes according to the attribute type attached to the user, for example in a "guest" or owner mode.

The links or associations between users and representative entities may be represented in an independent relationship table in order to be able to describe any type of relationship, according to a relationship type called «n-n». Thus, a user may be related with several representative entities and vice versa.

Indeed, a user is likely to monitor several different devices, groups of devices or installations and a device, group of devices or an installation may be accessed by different users.

As example, a «multi-account» configuration may correspond to one user related to one or several device(s) or installation(s), in particular in the case where a user is owner of several installations. The user who has several installations and wants to be able to pilot them remotely with one single user account, in particular in order to avoid having several user names or passwords to retain. A typical case corresponding to this example is a user having a main and a secondary residence. In this case, the user has a relationship with each of the installations, with an ownership flag attribute.

According to a second example, a device is related to two associations between an installation and a user. The two accounts may be active at the same time. A sharing of access to the installation may be considered. Thus, a user wants to provide access, whether limited or not, to other persons on an installation that he owns. A typical case corresponding to this example is the creation of secondary accounts for the members of the family. In this case, the main user creates secondary accounts that he relates to his installation, with a restricted access profile where necessary.

Another example corresponds to a home automation installation which is entirely under the control of one owner user. All the devices belonging to this installation are accessible by this user with access attributes corresponding to an «owner» profile, according to a first association. An equipment physically belonging to this home automation installation, for example a heating equipment is accessible in a «maintenance» mode for a second user, for example the supplier of the device or a specialized installer, via a second association.

In the particular case where the person that he wants to authorize already has an account on the management platform, a link may be created directly between this user and the installation, without the necessity to create a new account.

The information regarding the identifiers of the installation and of the user may be explicit, for example contained in the configuration message. Alternatively, this information may be implicit, for example by identifying the source IP address of the message for a central control unit in order to define the identifier of the installation if this installation comprises one single central control unit, or with reference to an installation identifier or to another central control unit in the case where the installation comprises several central control units. In the same manner, a connection with the terminal may be determined by the input of a login and a password, or a PIN code which allows identifying the user.

According to an aspect of the invention, the method comprises a first step of creating a first association between at least one first user profile and at least one first representative entity of at least one device, at least one first access attribute being related to said first association and a second step of creating a second association between at least one second user and the first representative entity or a second representative entity comprising at least one device in common with the first representative entity; at least one second access attribute being related to said second association.

According to an aspect of the invention, the second representative entity may be combined with the first one or distinct therefrom.

According to an aspect of the invention, a validity period is related to the second association, wherein the at least one second access attribute defines a non-exclusive access right for the second user on said common device during the validity period, and the at least one first access attribute defines a non-exclusive access for the first user during the validity period.

These arrangements define a temporary access sharing. The relationship between a user and installation may cover one or several validity time slots. In this case, access to the installation is possible only within the specified time slots. A typical case corresponding to this configuration is an access limited over time or within working hours. Alternatively or complementarily, the validity duration may be defined between a starting date and an end date.

According to an aspect of the invention, a validity period is related to the second association, the at least one second access attribute defines an exclusive access right for the second user on said common device during the validity period, the at least one first access attribute corresponding to an access prohibition for the first user during the validity period.

These arrangements define a temporary delegation. This is actually a case in which a user decides to temporarily provide access to his installation to another user, while deactivating his own access to this installation during the same period. A typical case corresponding to this configuration is the rental of a real-estate property.

According to an aspect of the invention, the at least one access attribute comprises at least one of the following elements:
- An ownership flag;
- An installation label;
- An access rights profile; or
- A default installation flag.

The ownership flag allows indicating that this installation has been registered by the associated user. Usually, it is the user who has declared/created the installation.

The owner user is considered as the main user of the installation. As such, he has a particular status enabling him to access to some operations such as:
- A complete cancellation,
- The addition/deletion of secondary users on his installation,
- The addition/deletion of an association between the user and the representative entity.

The installation label enables the user to customize the name of each installation to which he has access. As example, the labels may be «Main residence», «Secondary residence» or still «House of the neighbor».

These arrangements allow differentiating the installations when the user has access rights on several installations. During the use of a human-machine interface, for example, the user may be required to choose the installation that he wants to control from a list of labels. Alternatively, the label may comprise or be constituted by a recognition sign, for example an icon or an image.

When a user is associated to an installation, a generic or customized access right profile may be assigned thereto.

This access right profile defines the access rights to the products of the installation, that is to say:
- The possibility of seeing the characteristics of a home automation device, the values of its state variables or of a subpart of its state variables.
- The possibility of piloting a device or a subpart of its functions.

According to an aspect of the invention, the access rights profile corresponds to a predefined access right profile and/or to a list of access rights on devices or groups of devices related to a representative entity.

Thus, it is possible to finely set the visibility and the piloting of the home automation devices.

Typically, the main user of the installation has an access rights profile offering full access without restriction. Conversely, the other users associated to the same representative entity, for example within the family circle or amongst the neighborhood, may be subjected to filters in order to reduce their rights to access the devices of the installation. As example, they may have access to consultation only, or to pilot a particular product or function.

A relationship between a user and an installation may be declared as «default». In the case where access to a human-machine interface requires the selection of an installation, this flag allows sparing the user having to choose his installation by pre-selecting one at start. The user can change the selected installation later on.

According to an aspect of the invention, the method further comprises the following steps:
- Sending at least one distribution message regarding the creation or the update of the at least one association to at least one central control unit belonging to the installation corresponding to the representative entity of at least one device concerned by the association.

These arrangements allow providing an access control on the basis of the access attributes locally on the central control unit.

Thanks to these arrangements, a user «guest» can use a user terminal as a control point. In particular, the user terminal can communicate with the central control unit according to an open protocol such as for example Wifi, Bluetooth, Zigbee. The control unit can apply access filters and communicate with the home automation devices according to a proprietary protocol. In this case, the central control unit can identify the user thanks to his user terminal, but the home automation devices do not have to know the user.

According to one possibility, the same user «guest» can use proprietary control points, such as for example a remote control. This use may be limited or prohibited by the central control unit or on the initiative of the management unit, which may send a block message to the home automation devices.

An example of use is a temporary delegation of use. The devices receive the commands emitted by the proprietary remote controls and may execute them or not depending on the received block messages. It is not necessary that the home automation devices or even the management unit be capable of identifying the user.

According to an aspect of the invention, the configuration method further comprises the following steps:
- Determination of a display configuration regarding at least one command on at least one home automation device which may be triggered by a user and/or at least one state variable of a home automation device which may be visualized by a user according to the at least one access attribute;
- Sending at least one display configuration message regarding said display configuration to a user terminal.

These arrangements allow providing a display adapted to the access attributes of a user.

According to an aspect of the invention, the configuration method comprises the following steps:
- Reception of a first message for requesting the registration of a first central control unit for the installation emitted by a first central control unit, or alternatively by a user terminal, in connection with a first identification information;
- Obtainment of a first information on the attachment of the first central control unit to a representative entity of at least one home automation device corresponding to a representative entity of at least one home automation installation;
- If the first attachment information corresponds to an absence of attachment of the central control unit to a previously registered installation, creation of a representative entity of the installation and attachment of the first central control unit to said representative entity.

According to one possibility, the first registration message is combined with the configuration message. According to one possibility, the obtainment step may be carried out simultaneously with the step of selecting or creating a representative entity.

According to an aspect of the invention, the configuration method comprises the following steps:
- Reception of a second message for requesting the registration of a second central control unit for the installation, emitted by the second central control unit, or alternatively by a user terminal, in connection with a second identification information (IID2);

Obtainment of a second information on the attachment of the second central control unit to a representative entity of a home automation installation;

In the case where the second attachment information corresponds to an attachment to a representative entity of an installation comprising the first central control unit is present, an attachment of the second central unit to a representative entity of the installation to which is also related the first central control unit.

According to an aspect of the invention, the configuration method comprises the following steps:

Reception of a registration message originating from a user terminal comprising an identifier of an installation and at least one identifier of a central control unit;

Creation or update of a representative entity of the installation corresponding to the identifier of the installation, which representative entity is associated to a group comprising the at least one identifier of a central control unit.

According to an aspect of the invention, the configuration method further comprises the following step:

Reception of a topology description message originating from a user terminal comprising a description or an update of a description of a group of devices related to the identifier of the installation; and Attachment to the representative entity of the home automation installation of the group of devices related to the identifier of the installation.

According to one possibility, the topology description message may be combined with the configuration message.

According to an aspect of the invention, the configuration method comprises the following steps:

Reception of a topology description message originating from a central control unit related to the identifier of the installation comprising a description or an update of a description of a group of devices related to said central control unit; and Update of a group of devices related to the representative entity on the basis of the description or the update of a description of the group of devices related to said central control unit.

The present invention also concerns a monitoring method of a home automation installation, the method being executed by a management unit connected to the at least one home automation installation or by a central control unit and comprising the following steps:

i. Reception of a control message originating from a user terminal or an application on the management unit or on another connected management unit, the control message regarding a user and at least one home automation device of the installation;

ii. Selection of a user profile corresponding to the concerned user in a users repository;

iii. Selection of a representative entity of the at least one home automation device in a representative entities repository;

iv. Selection of an association between the at least one user and the at least one representative entity of the installation concerned by the control message in an associations repository;

v. Determination of at least one action to carry out according to the control message and at least one access attribute related to the association;

vi. Triggering of the execution of the at least one action if the at least one access attribute defines an authorization of said action; or Absence of triggering of the execution of the at least one action if the at least one access attribute defines an absence of authorization of said action.

According to one possibility, the triggering of the action is carried out directly by sending a command to a device, in the case where it is the central control unit which executes the method; or indirectly, by sending to the central unit to which the device is related, in the case where it is the management unit which executes the method.

In the case of execution by a central control unit, the arrangements according to the invention allow reducing the calculation load on the management unit. The associations between the representative entities and the user profiles and the respective attributes should be transmitted beforehand by the management unit to the central control unit.

According to an aspect of the invention, in the case where the action is not triggered, an error message may be sent back to the user terminal or to the application.

According to an aspect of the invention, parameters of the action may be modified according to the at least one access attribute before triggering the action.

By action, it may be understood the execution of at least one command; or still the triggering of a scenario or a group of commands communicated beforehand to the central control unit and identified by a command group or scenario identifier; in this case, the corresponding message contains this identifier.

The triggering of the action may be direct by the central control unit; or indirect, by sending a notification or control message to the management unit or another central control unit.

According to another possibility, an action may correspond to a message to a user terminal regarding at least one state variable or a display configuration regarding the commands that can be triggered.

According to another possibility, an action may correspond to a data update by the management unit.

By scenario, is meant a set of commands comprising at least one command intended to at least one home automation device, said set being prerecorded in at least one central control unit, the scenario may be triggered on the basis of a command of the user, an event triggered by the completion of a condition on the time and/or the date, or still a condition on a state variable of a home automation device which may in particular be a sensor measurement or a state variable of a home automation device. A scenario may be identified by a scenario identifier.

Grouped command or group of commands means a set of commands comprising a plurality of commands intended to one or several home automation device(s), the plurality of commands being intended to be sent to at least one central control unit for execution on reception.

According to an aspect of the invention, the step of receiving at least one control message corresponds to a request for carrying out a command, a grouped command or the triggering of a scenario originating from a user terminal.

According to an aspect of the invention, the step of receiving at least one control message corresponds to a connection of the user terminal to the management unit or to the reception of an indication that a connection with the user terminal is established or to an update request by the user terminal; and the action to carry out corresponds to sending to the user terminal:

at least one display configuration message regarding at least one command on at least one home automation device which may be triggered by a user and/or at least one value of a state variable of a home automation device which may be visualized by a user according to the at least one access attribute.

Thanks to these arrangements, the user terminal can display an interface presenting to the user the devices and their states or the available commands while applying, at the level of the management unit, a filter corresponding to the at least one access attribute.

These arrangements correspond to supervision operations. The at least one control message can trigger the sending of messages by the management unit containing values of the state variables of the devices, for a presentation of the information to the user.

These arrangements correspond to a state monitoring or active supervision mode, in which the user terminal sends a message corresponding to an explicit request regarding the state of one or several home automation device(s) to the management unit. The management unit communicates the values of the state variables while taking into account a filter corresponding to the access attributes associated to the user for the considered device.

According to an aspect of the invention, the method comprises a step of selecting at least one default association for a user connected via the user terminal.

These arrangements allow selecting at least one device, a group of devices or a default installation to present to the user, in the case where a user identifier, such as for example a login/password, designates only a user, and not an association between a user and a representative entity of at least one home automation device.

According to an embodiment, the selection is carried out on the basis of the at least one access attribute of the associations regarding the considered user. According to another embodiment, it is possible to present all the associations regarding the user to said user, and ask him to choose the default association.

The present invention also concerns a supervision method of a home automation installation, the method being executed by a management unit connected to the at least one home automation installation or by a central control unit and comprising the following steps:

i. Reception of a state notification message originating from a central control unit of a home automation installation containing an indication regarding at least one state variable of a home automation device or an indication regarding the completion of a command;

ii. Selection of a representative entity of the at least one home automation device in a representative entities repository;

iii. Selection of at least one association between the at least one representative entity and at least one user in an associations repository;

iv. Selection of the at least one user profile corresponding to the at least one association in a users repository;

v. Determination of a notification authorization for the at least one user profile according to the state notification message and at least one access attribute related to the association;

vi. Sending at least one state notification message to a user terminal held by a user corresponding to the user profile regarding said state variable of a home automation device or said completion of a command if the at least one access attribute defines a notification authorization.

These arrangements correspond to an event-based supervision mode, in which a user is subscribed to some events, for example the change of the values of state variables. The management unit may send a notification message during a state change. The management unit communicates the values of the state variables while taking into account a filter corresponding to the access attributes associated to the user for the considered device.

According to one possibility, the method further comprises a step of updating a value of the state variable in a state variables values repository.

According to one possibility, the method comprises a step of aggregating a plurality of notification messages for the determination of a result of a command.

According to an aspect of the invention, a validity period is related to the at least one association, the at least one access attribute defining an access right during the validity period.

According to an aspect of the invention, the at least one access attribute comprises at least one of the following elements: an ownership flag; an installation label; an access rights profile; or a default installation flag.

According to an aspect of the invention, the access rights profile corresponds to a predefined access right profile and/or to a list of access rights on devices or groups of devices related to a representative entity.

The different non-incompatibles aspects defined hereinabove may be combined.

BRIEF DESCRIPTION OF THE FIGURES

The invention will be better understood from the detailed description which is exposed hereinafter with reference to the appended drawing in which:

FIG. 3a is a diagram representing the relationships between an entity representative of a home automation installation, the central control units and the devices of the home automation installation;

FIG. 3b is a diagram representing the relationships between an entity representative of a group of devices and the devices of the home automation installation;

FIG. 3c is a diagram representing the relationships between an entity representative of a home automation device and said device of the home automation installation;

DESCRIPTION WITH REFERENCE TO THE FIGURES

In the following detailed description of the figures defined hereinabove, the same elements or the elements filling identical functions may preserve the same references so as to simplify the understanding of the invention.

Description of a System Comprising a Home Automation Installation

Figure 1:
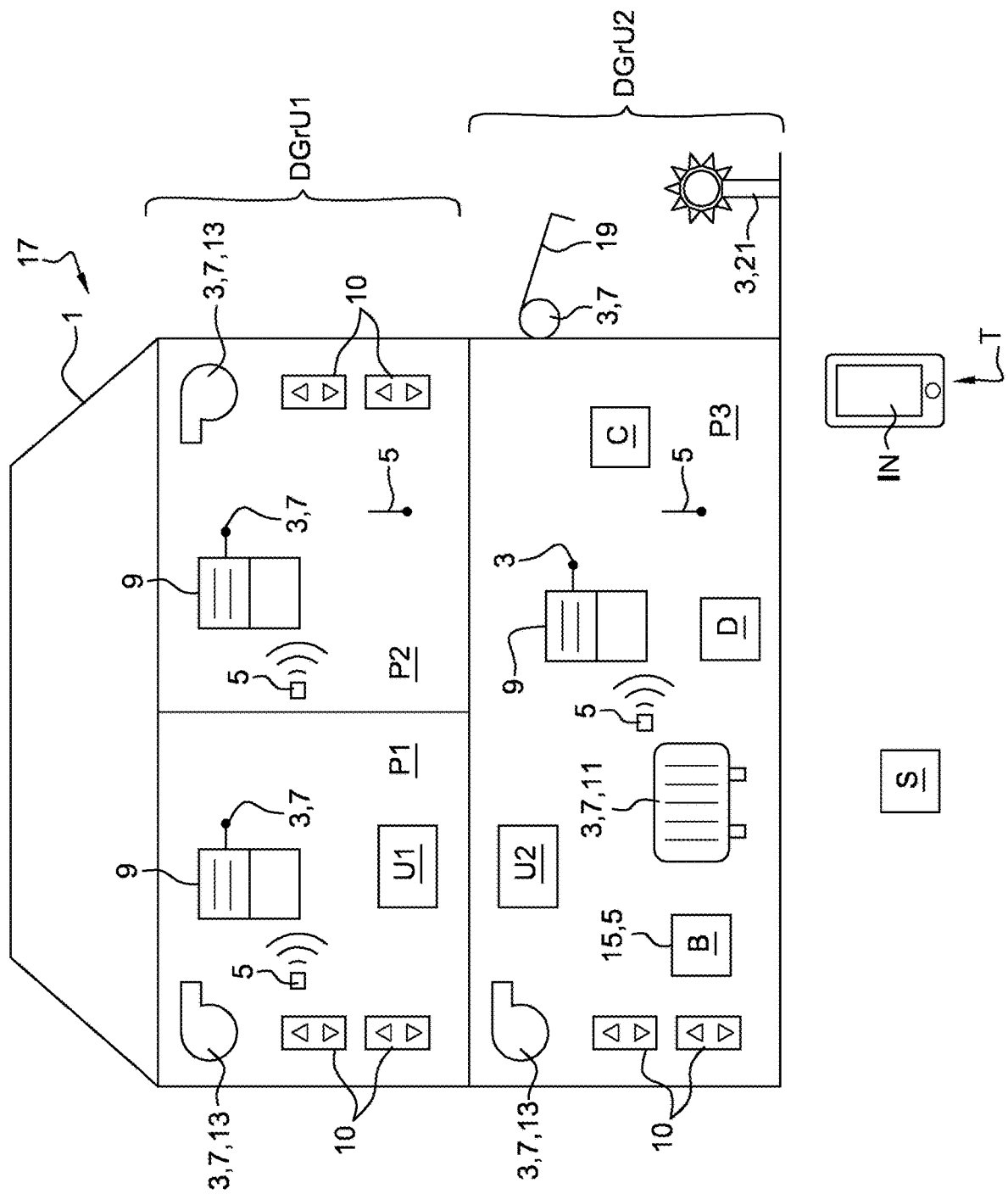
FIG. 1 is a schematic view of a building and of a home automation installation in accordance with an embodiment of the invention.

As illustrated in FIG. 1, a building 1 comprises for example three rooms P1, P2, P3. The building 4 also comprises home automation equipment 3 and sensors 5.

A home automation equipment 3 may consist of an actuator arranged to displace or set an element of the building 1, for example an actuator 7 for displacing a rolling shutter 9 or a terrace awning 19, or a regulation system 10 for a heater 11 or a ventilation system 13. A home automation equipment 3 may also consist of a lighting, for example a terrace external lighting 21 or a lighting control system, an alarm system, or still a video camera, in particular a video-surveillance camera.

The home automation installation 17 may also comprise a control point 15 an actuator 7, such as a wireless control box B for the rolling shutter 9.

The home automation installation 17 may comprise one or several sensor(s) 5, integrated to an actuator 7, to a control point 15 or to the control box B or independently of these elements. In particular, a sensor 5 may be arranged to measure a physical unit, for example a temperature sensor, an insolation sensor or a humidity sensor. Position sensors 5 of home automation equipment 3 of the building 1, such as, for example, sensors of the open state of a rolling shutter 9 or sensors of the position of a door leaf such as a window, whether motorized or not, may also be provided. The home automation installation may also comprise one or several presence sensor(s).

A home automation equipment 3 and a sensor 5 should thus be considered as units having information on observed actual states of elements of the building 1 and being capable of sharing this information with other elements of the home automation installation 17.

The home automation equipment 3 and the sensors 5 can thus have access to any measurable physical unit, such as the temperature of each room P1, P2, P3 or a state of an element of the building 1, such as the open state of a rolling shutter 9, the state of an alarm, etc.

In the following, we will use the home automation device or device D designation indifferently to designate sensors or home automation equipment, or parts of home automation equipment 3 or sensors 5.

The home automation installation 17 comprises a plurality of central control units U1, U2. In particular and as example, two central control units U1, U2 are represented in FIG. 1. According to one variant, a home automation installation may also comprise one single central control unit.

Each central control unit U1, U2 is arranged to control and/or monitor part of the devices D of the installation 17 forming a group DGrU1, DGrU2. As example, in FIG. 1, the central control unit U1 is in charge of the devices D disposed in the rooms P1 and P2 of the first floor of the building, whereas the central control unit U2 is in charge of the devices D disposed in the room P3 on the ground floor of the building and the external devices.

In particular, the control and/or monitoring is carried out remotely, in particular using a wireless communication protocol, for example a radio communication protocol. Each central control unit U1, U2 is arranged to group together all data originating from the devices D of its group DGrU1, DGuU2 and to process these data.

The devices D parts of a group DGrU1, DGrU2 belong to a local area network managed by a central control unit U1 or U2 within the home automation installation and communicate according to a local communication protocol with the central control unit U1 or U2. They have a local address in this network. The logical devices D may be modelled as nodes or end points in the local area network.

The local addressing system may be hierarchical or flat, the address format may be numeric or alphanumeric.

Figure 2:
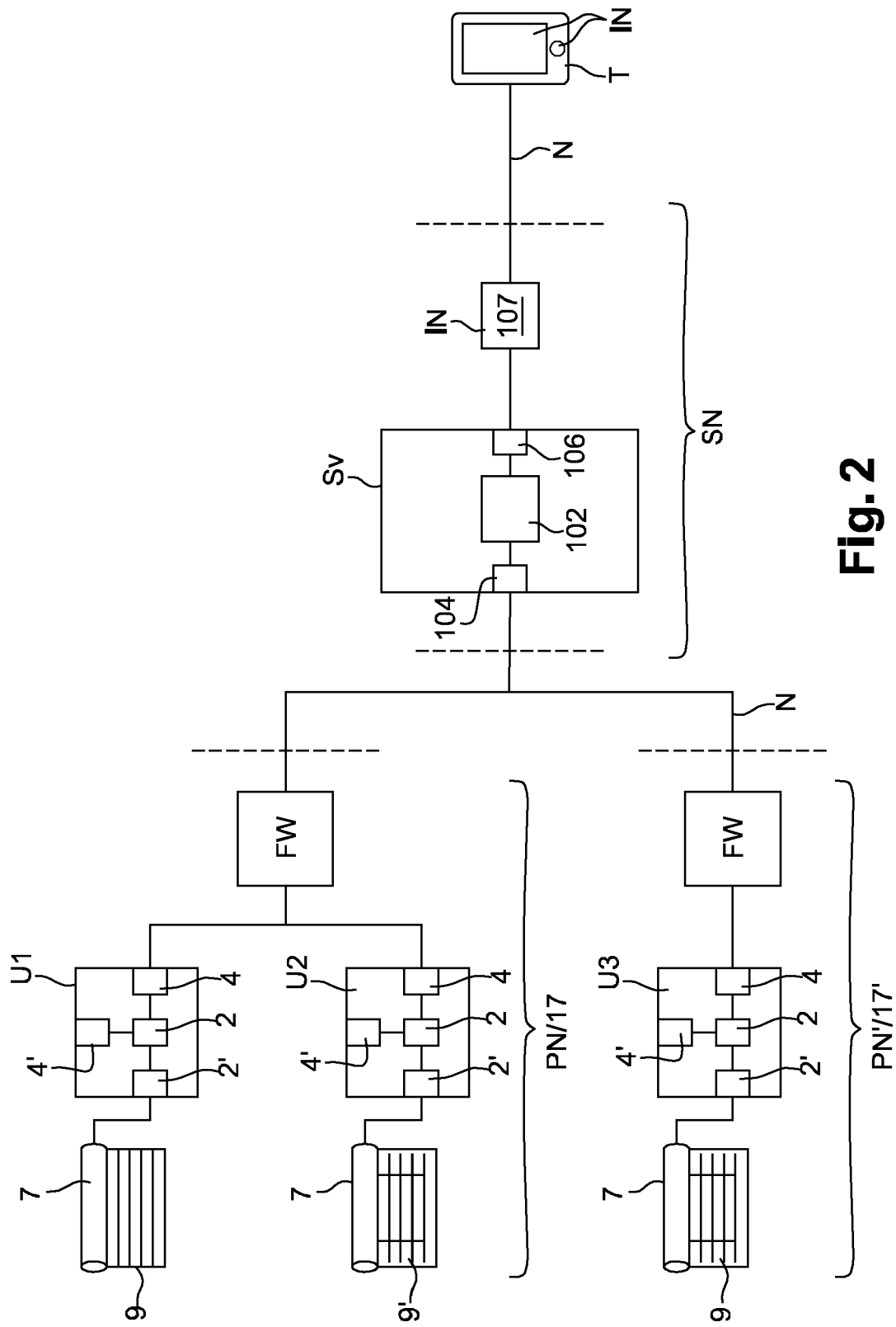
FIG. 2 is a diagram presenting an architecture of a system comprising the home automation installation illustrated in FIG. 1, a second home automation installation, as well as a server intended to be connected to a user terminal.

As represented in FIG. 2, each central control unit U is arranged to communicate with a server Sv.

The central control units U1, U2, U3 are disposed on a private network PN, PN', whose access is generally protected by a firewall FW. In particular, in the example represented in FIG. 2, two central control units U1, U2 are disposed on a first private network corresponding to a first home automation installation, whereas a third central control unit U3 is disposed on a second private network PN', independent of the private network PN corresponding to a second home automation installation 17'. The server Sv is also disposed on a private network SN. The private network PN is linked to a wide area network N, for example the Internet. Of course, the server Sv is arranged to communicate with a set of such central control units U. We will describe in the following one of these units.

A central control unit U comprises a processing unit 2 arranged to contain and execute a first computer program. As example, the processing unit 2 comprises a processor, a storage flash memory as well as a random access memory, and an Ethernet chip.

The central control unit U further comprises at least one communication module 2' intended to monitor and/or control home automation equipment 3 and/or sensors 5, the home automation equipment 3 may consist of actuators 7, lightings 21, an alarm system, or a video camera.

As example, as represented in FIG. 2, the communication module 2' enables the monitoring and control of at least one actuator 7, a movable element of the building 1, such as for example a rolling shutter 9, or an orientable sunshade 9' or other actuators 7 or lightings 21, as previously described with reference to FIG. 1.

As example, the communication module 2' may be arranged to implement for example one or several of the protocols Z-Wave, EnOcean, io-Homecontrol, Somfy RTS, KNX, MODBUS, Wavenis, Philips HUE.

According to another possibility, for example in the context of alarm systems, the central control unit may be integrated into the home automation device. According to still another possibility, the central control unit may also be integrated to a router and/or a modem achieving a connection to a wide area network, in particular the Internet.

There is also provided the reception of information from a sensor 5 providing information on the presence of a user or values of the surrounding parameters such as temperature, humidity and luminosity. In the same manner, the central unit U may enable the monitoring and/or control of an alarm system.

Each central control unit U further comprises a module 4 for communicating with the server Sv. The server Sv enables the remote control and/or monitoring and comprises one or several processing unit(s) 102 arranged to contain and execute a second computer program.

Each central control unit U further comprises a communication module 4' to communicate according to a local communication protocol, for example Bluetooth, Zigbee or Wifi, with a mobile communication terminal T. The communication terminal T may contain and execute an application software APP.

In some applications, a central control unit U may communicate with the management unit through an intermediate server, for example a third-party service provider, whose intermediate server provides a service interface or API. In turn, the server Sv comprises at least one communication interface 104 intended for the communication with the central unit U.

The server Sv may also comprise a communication interface 106 intended for the communication with a control and/or monitoring interface IN enabling a user to remotely monitor the home automation installation.

It should be noted that the term server is a logical designation which may cover the use of several physical servers to distribute the computer processing load to be carried out.

For example, the control and/or monitoring interface IN comprises a web server 107 and a mobile communication terminal T communicating via the wide area network N. For example, the mobile communication terminal T may consist of a smartphone or a tablet. The mobile communication terminal T may be the same or a terminal of the same type as that with which the central control unit U communicates locally by means of the communication module 4', or a different terminal. We will designate these mobile terminals indifferently by the reference T.

The control and/or monitoring interface IN comprises a processor which may be disposed at the level of the web server 107 and/or the mobile communication terminal T.

The processor of the control and/or monitoring interface IN is arranged to use a third computer program. In turn, this third computer program is arranged to execute a downloadable application.

The mobile communication terminal T comprises a data input device and a display device, for example in the form of a tactile control portion of a screen of the terminal T and in the form of one or several button(s) of the terminal T.

FIGS. 1 and 2 describe an installation 17 which comprises a set of devices D and a plurality of central control units U1, U2, disposed within the same dwelling, the same building or the same physical location.

An example of an embodiment of a unique identifier of a device DURL will now be described.

According to this embodiment, the unique identifier of a device DURL comprises information on:
The local native protocol of the home automation device D;
The communication path to the device D, including the intermediate central control units U and the termination addresses to cross, whether organized or not in a hierarchical topology;
A subsystem identifier subsystemId if the device comprises several functional subsets or subsystems which may be addressed separately. The devices which comprise only but one functional set have no extension for identifying a subsystem.

Thus, the form of the unique identifier of a device DURL may be as follows:
<protocol>://<gatewayId>/<rawDeviceAddress>(#<subsystemId>)
Wherein the following fields are present:
protocol: identifier of the native device local protocol.
gatewayId: identifier of the first central control unit U, for example a serial number or a unique identifier.
rawDeviceAddress: a simple or multi-level path. Its meaning and its format depend on the addressing scheme of the local communication protocol of the device D.
subsystemId: this optional field indicates an identification, for example a rank of the subsystem (starting for example at 1), if such a subsystem is present.

EXAMPLES

1) Knx://0201-0001-1234/1.1.3
This unique identifier of a device DURL corresponds to a device D communicating by the KNX protocol with an individual address 1.1.3 accessible to the central control unit U carrying the identifier #0201-0001-1234.
2) io://0201-0001-1234/145036#2
This unique identifier of a device DURL corresponds to a subsystem carrying the number 2 associated to a device D communicating by the io-Homecontrol protocol with a radio address 145036 accessible to the central control unit U carrying the identifier #0201-0001-1234.

The handling of the data relating to the devices D at the level of the server Sv are carried out by an execution process or service ES. In order to store the data relating to the different above-mentioned device instances D, the execution service may have access to an instances database IDB. Of course, these different instances types may also be stored in a separate manner. Moreover, by database, is herein meant an appropriate storage method for a set of instances, which may be memorized in a list, a tree or tables or any other appropriate data structure.

Representative Entities

We will now describe, with reference to FIG. 3a, the representation of the installation 17 by a representative entity RE on the server Sv, in the case where the installation comprises multiple central control units U.

The system according to the invention can relate several central control units U to one single object RE representing an installation 17 by a configuration at the level of the server Sv.

Thus, the server Sv may present to the user the installation 17 as one single set of devices D, for example via an Application Programming Interface or API, in which each device D may accept a given set of commands C or present state variables S.

The server Sv may also use an abstraction system or layer for the commands C and the state variables S in order to propose an API more generic and independent of the communication protocol used by a given device D.

As example, the identification of the representative entity RE of the installation may be a carried out by:
a serial number or another identifier of a device belonging to the installation, if this device belongs to only one installation;
an identifier or a number of a central control unit belonging to the installation, if this unit belongs to only one installation;
an installation identifier or number created beforehand by the management unit at the first declaration of a device and/or central control unit.

These three examples also apply in the case of a representative entity corresponding to a group of devices or to one single device.

Thus, in order to simplify the designation of an installation in the public APIs, all it needs is that the users of these APIs provide a unique identifier related to the representative entity St of the installation 17.

Internally to the server, a unique identifier of the representative entity RE of the installation 17 may exist in order to facilitate the implementation.

The representative entity RE may be associated to a list or group of devices DGrRE grouping together the devices contained in the different groups DGrU1, DGrU2 related to each central control unit U1, U2, and to a group UGrRE of the identifiers UID of the concerned central control units U. The devices are identified by a unique identifier. A representative entity of the home automation installation may be associated with a given user Usr1, identified by an identifier UsrID, corresponding for example to a login and password combination or with a given group of users UsrGrRE, in a manner which will be described later on with reference to FIG. 4.

According to another possibility represented in FIG. 3b, a representative entity RE may represent only one group of devices DGrRE which does not necessarily relate to the same central control unit. According to still one possibility represented in FIG. 3c, a representative entity RE may represent only one single home automation device D.

Thus, a representative entity RE is a data structure which represents a home automation device D, a group of home automation devices DGrRE or an installation 17.

Association Between a Representative Entity and a User

Figure 4:
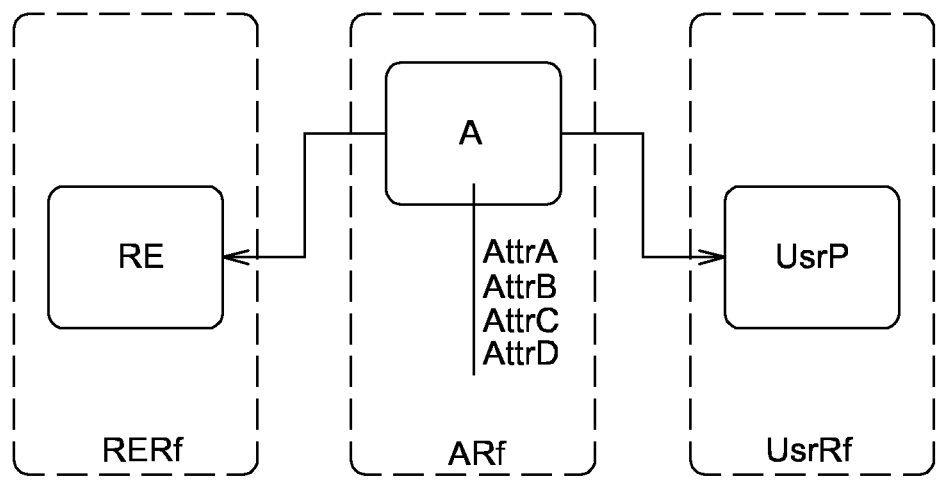
FIG. 4 is a diagram representing the relationships between a representative entity, a user and an association to which attributes are related.

The attachment of a representative entity to one or several user profile(s) according to the invention will now be described with reference to FIG. 4.

A user profile comprises at least one user identifier which represents the user in a unique way for the server. The user identifier typically corresponds to a character string chosen at subscription or to an email. Information enabling the authentication of the user may also be attached to the user profile such as a password or other authentication factors. Optionally, personal information may also be attached to the user profile, such as a name, a first name or an address.

A representative entity RE is related to a user or to a group of users UsrGr via an association A. An association A defines the relationship between at least one user Usr and a representative entity RE. The association may be related to one or several access attribute(s) Attr.

In particular, an access attribute Attr may correspond to any of the following elements:
  An ownership flag AttrA;
  An installation label AttrB;
  An access rights profile AttrC; or
  A default installation flag AttrD.

According to an embodiment, each association is associated to one value for all the attributes mentioned hereinabove.

An ownership flag AttrA allows indicating that this installation has been registered by the associated user. Typically, for a given installation, the owner user is the one who has declared/created the installation.

The owner user is considered as the main user of the installation. As such, he has a particular status enabling him to access some operations such as:
  A complete cancellation,
  The addition/deletion of secondary users on his installation,
  The addition/deletion of an association between the user and the representative entity.

The same user, may be owner of a first installation corresponding to a first representative entity RE, a first association A between the user and the representative entity comprising an ownership flag attribute AttrA activated and considered as non-owner or secondary user on a second installation corresponding to a second representative entity RE, via a second association A with no ownership flag.

The installation label AttrB enables the user to customize the name of each installation to which he has access. As example, the labels may be «Main residence», «Secondary residence» or still «House of the neighbor».

When a user is associated to a representative entity RE, a generic or customized access right profile AttrC may be assigned thereto.

This access right profile defines the access rights to the products of the installation, that is to say:
  The possibility of seeing the characteristics of a device D, the values of its state variables S or of a subpart of its state variables S.
  The possibility of piloting a device or a subpart of its functions.

The access rights profiles may correspond to predefined profiles and/or to a list of rights on devices or groups of devices belonging to a representative entity.

Thus, as example, it is possible to provide for different levels for the control or piloting and supervision. In particular, for the control and piloting, it is possible to provide for several rights levels:
  1—Authorization to pilot all the commands of all devices;
  2—Authorization to pilot all the commands of one device;
  3—Authorization to use a particular command of one device.

The authorizations may be modified by specific attributes. For example, a tenant may have his piloting authorization restricted: he can modify the temperature setpoint of a thermostat, but only by a predetermined number of degrees around a fixed value.

The authorizations 2 and 3 may be multiple and contained in a list for covering several devices and/or commands.

For the supervision, it is also possible to provide for several rights levels:
  1—Authorization to consult all the state variables of all devices;
  2—Authorization to consult all the state variables of one device;
  3—Authorization to consult one state variable of one device.

The authorizations 2 and 3 may be multiple and contained in a list for covering several devices and/or state variables.

It is possible to provide for several users levels.

The rights of a user of a given level may be defined by a user of a higher level for an individual device or a group of devices. The rights granted to the user of the lower level are limited to the rights available for the user of the higher level.

As example, it is possible to provide for two users levels, with a first level comprising a main user, and a second level comprising the secondary users.

Typically, the main user of the installation has an access rights profile AttrC offering full access without restriction. Conversely, the other secondary users, for example within the family circle or amongst the neighborhood, associated to the same installation may be subjected to filters in order to reduce their rights to access the elements of the installation. As example, they may have access to consultation only, or to pilot a particular product or function.

Predefined types of access rights profiles may be defined, for example «owner» or «guest».

A relationship between a user and an installation may be declared as «default» thanks to the default installation attribute AttrD.

In the case where access to a user interface requires the selection of a representative entity, this flag allows sparing the user having to choose his installation by pre-selecting a representative entity at start. The user can change the selected representative entity later on.

A validity period VP may also be related to an association. This validity period may be periodic and correspond for example to schedules for enabling some command types, or still define a duration of use between a starting date and an end date.

During the validity period, two possibility are offered regarding the access profiles:

According to one possibility, a temporary access sharing may be performed.

According to another possibility, a temporary delegation may be performed. This is actually a case in which a user decides to temporarily provide access to his installation to another user, while deactivating his own access to this installation during the same period. A typical case corresponding to this configuration is the rental of a real-estate property. During this period, the owner has no longer access to his installation which is under the control of the tenant. This is important from a legal point of view since the owner has no right to interfere with the real-estate property without authorization of the tenant during the period of occupancy of the property.

The fact of delegating the access to the installation does not necessarily delegate all the rights of the owner to the chosen user. Indeed, the tenant, even though he has an exclusive access to the dwelling, may have functional restrictions. As example, he can actuate the rolling shutters but cannot modify the configuration of the boiler.

The implementation of this delegation requires the introduction of an additional attribute or table to indicate the delegation. When a delegation is present, access to the installation by the delegating user will be blocked during the periods where the access will be authorized to the target user. These are actually antagonistic states. For example, if the access of the tenant is subjected to a temporal expiration, the access of the owner automatically becomes possible again at that date.

According to an embodiment, it is possible to save the instances of representative entities in a representative entities repository RERf, the instances of users profiles in a users repository UsrRf and the instances of associations in an associations repository ARf.

The handling of the data relating to the representative entities, to the users and to the associations at the level of the server Sv are carried out by an execution process or service ES. In order to store the data relating to the different above-mentioned repertories, the execution service may have access to an instances database IDB as mentioned before. Of course, these different instances types may also be stored in a separate manner. Moreover, by database, is herein meant an appropriate storage method for a set of instances, which may be memorized in a list, a tree or tables or any other appropriate data structure.

Example 1: Tenant

Figure 5A:
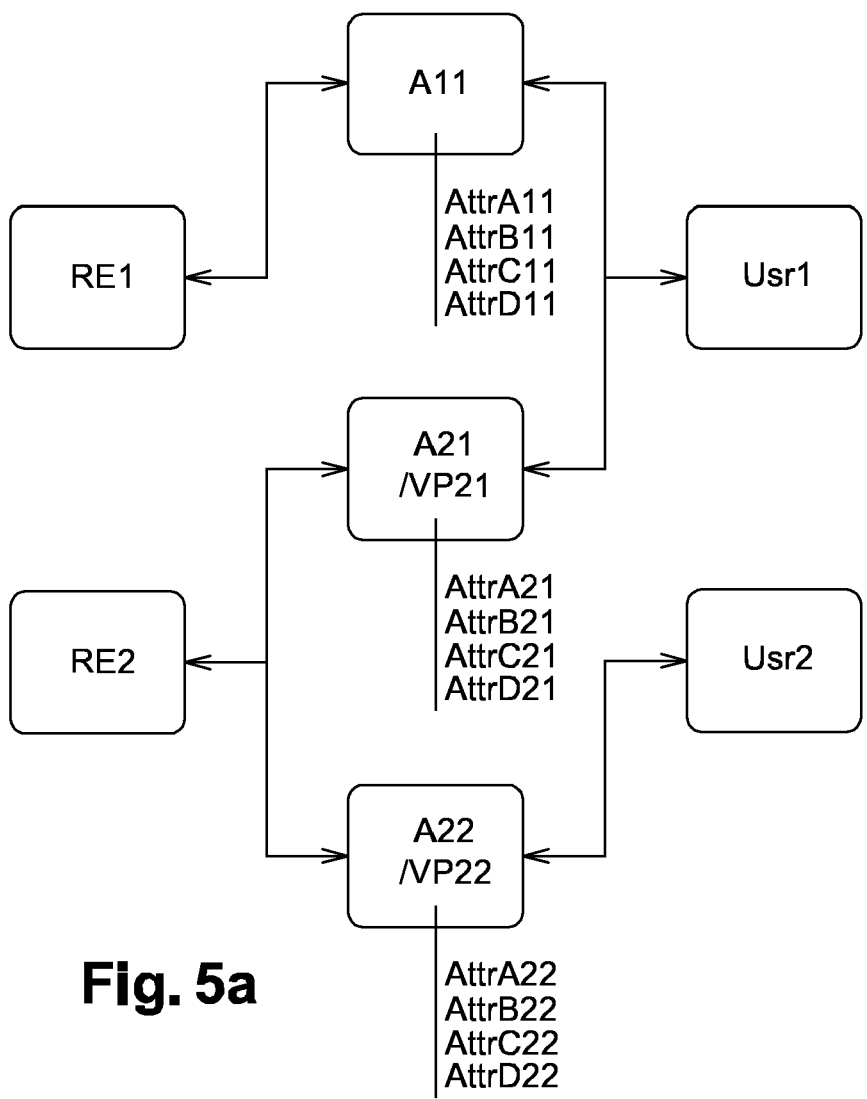
FIG. 5a represents a first example of a diagram of relationship between users and representative entities.

An example of a diagram of relationship between users Usr1, Usr2 and representative entities is represented in FIG. 5a. Thus, a first representative entity RE1 may be related to a first user Usr1 via a first association A11. Attributes AttrA11, AttrB11, AttrC11, AttrD11 are defined for this association. In particular, the ownership flag attribute AttrA11 may have a true or activated value, indicating that the user Usr1 is owner of the device, of the group of devices or of the installation corresponding to the representative entity RE1. As example, the representative entity RE1 may correspond to a home automation installation of the main residence of the user Usr1. Thus, the attribute AttrB1 may take on the value «main residence». The access rights profile attribute AttrC11 may take on a value indicating full access rights. The attribute AttrD11 may take on a true or activated value to indicate that the installation corresponding to the representative entity is the default installation for the user Usr1.

A second representative entity RE2 may be related to the first user Usr1 via a second association A21. Attributes AttrA21, AttrB21, AttrC21, AttrD21 are defined for this association. In particular, the ownership flag attribute AttrA21 may have a true or activated value, indicating that the user Usr1 is owner of the device, of the group of devices or of the installation corresponding to the representative entity RE2. As example, the representative entity RE2 may represent an installation of another building whose owner is the user Usr1, but which is rented. Thus, the attribute AttrB11 may take on the value «apartment for rent». The access rights profile attribute AttrC11 may take on a value indicating full access rights. The attribute AttrD11 may take on a «false» or deactivated value to indicate that the installation corresponding to the representative entity RE2 is not the default installation for the user Usr1.

According to other possibilities, the second representative entity may also correspond to:
- a group of devices DGrRE designated by the owner, such as a set of shutters with an access profile attribute «authorized control» for a tenant user.
- a group of devices DGrRE related to the same central control unit. This situation may correspond to a case in which a first central control unit pilots the devices of a portion of a building occupied by an owner, and a second central control unit piloting the devices of a second portion of the building intended to be occupied by a tenant. The association between the tenant user and the group of devices related to the second central control unit may be attached to an access attribute corresponding to a «guest» mode.

The second representative entity RE2 may be related to a second user Usr2 via a third association A22. Attributes AttrA22, AttrB22, AttrC22, AttrD22 are defined for this association. In particular, the ownership flag attribute AttrA22 may have a false or deactivated value, indicating that the user Usr2 is not owner of the device, of the group of devices or of the installation corresponding to the representative entity RE2. Thus, the attribute AttrB11 may take on the value «rented apartment» or «shutters of the rented portion of the building» according to the previously-discussed examples. The access rights profile attribute AttrC11 may take on a value indicating full or partial access rights. The attribute AttrD11 may take on a «true» or activated value to indicate that the installation corresponding to the representative entity RE2 is the default installation for the user Usr2.

A validity period VP22 may be specified in connection with the third association A22, in association with the access right profile.

This validity period VP22 may be periodic and correspond for example to schedules for authorizing some command types. In this case, access to the installation is possible only within the specified time slots. A typical case corresponding to this configuration is an access limited over time or within working hours. Another case corresponds to a seasonal rental, for which the owner designates a set of shutters with the attribute «authorized control» between a starting date and an end date, for a tenant user.

An access delegation may be considered for the user Usr2. In this case, the access profile of the user Usr1 defined in the association A21 is deactivated during a validity period VP21 corresponding to the validity period VP22.

Example 3: Family Members

Figure 5B:
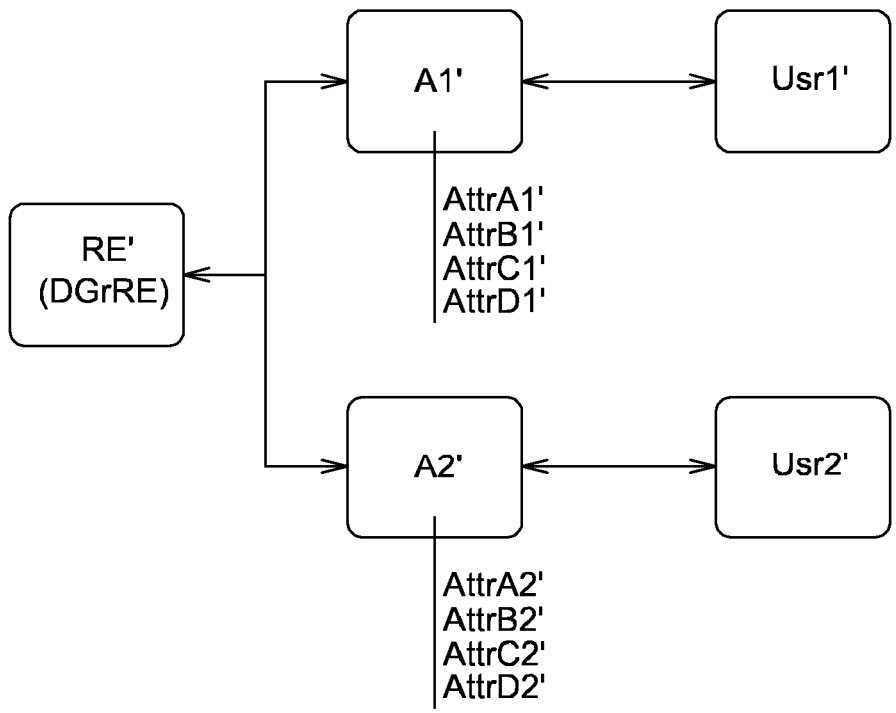
FIG. 5b represents a second example of a diagram of relationship between users and one representative entity.

A second example of a diagram of relationship between users Usr1', Usr2' and a representative entity RE' is represented in FIG. 5b. A typical case corresponding to this example is the creation of secondary accounts for the members of the family. In this case, the main user Usr1' creates secondary accounts Usr2' that he relates to his installation, with a restricted access profile where necessary. Thus, a representative entity RE' may be related to a first user Usr1' via a first association A1'. Attributes AttrA', AttrB', AttrC', AttrD' are defined for this association. In particular, the ownership flag attribute AttrA' may have a true or activated value, indicating that the user Usr1' is owner of the device, of the group of devices or of the installation corresponding to the representative entity RE'. As example, the representative entity may correspond to a home automation installation of the main residence of the user Usr1'. Thus, the attribute AttrB1' may take on the value «main residence». The access rights profile attribute AttrC1' may take on a value indicating full access rights. The attribute AttrD1' may take on a true or activated value to indicate that the installation corresponding to the representative entity is the default installation for the user Usr1'.

The representative entity RE' may be related to a second user Usr2' via a second association A2'. Attributes AttrA2', AttrB2', AttrC2', AttrD2' are defined for this association. In particular, the ownership flag attribute AttrA2' may have a false or deactivated value, indicating that the user Usr2' is not owner of the device, of the group of devices or of the installation corresponding to the representative entity RE'. Thus, the attribute AttrB1' may take on the value «main residence». The access rights profile attribute AttrC1' may take on a value indicating full or partial access rights. The attribute AttrD1' may take on a «true» or activated value to indicate that the installation corresponding to the representative entity RE' is the default installation for the user Usr2'. The two associations A1' and A2' may be active at the same time. Hence, a sharing of access to the installation is achieved. Thus, the user Usr1' provides access, whether limited or not, to other users Usr2' on an installation or a group of devices that he owns.

Example 3: Maintenance

Figure 5C:
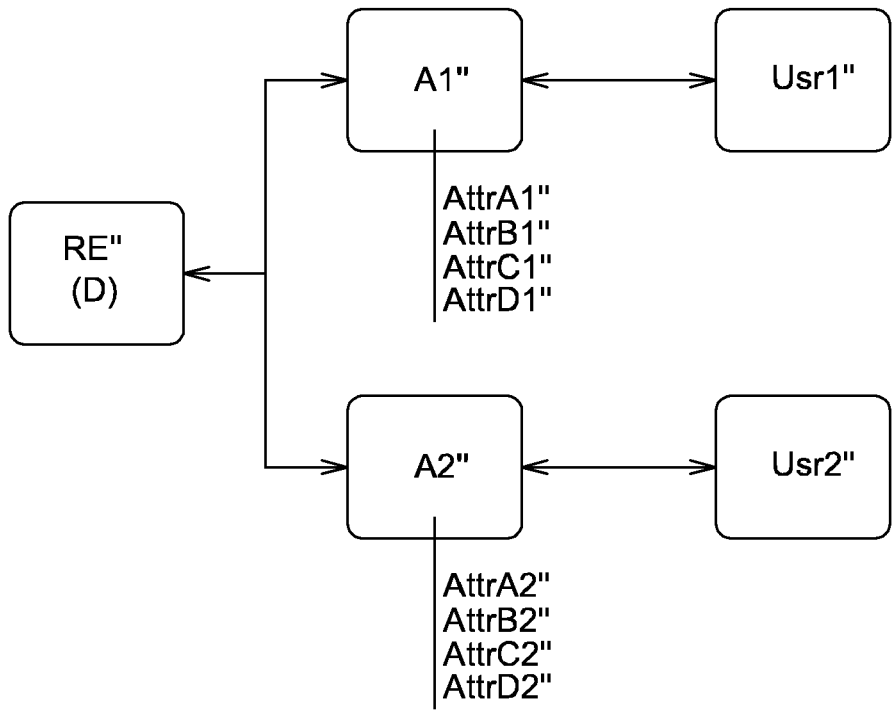
FIG. 5c represents a third example of a diagram of relationship between users and one representative entity.

A third example of a diagram of relationship between users Usr1", Usr2" and a representative entity RE" is represented in FIG. 5c. In this case, the representative entity corresponds to one single device. For example, this arrangement may correspond to the case of a device D such as a boiler which might be associated to a user Usr2" in charge of maintenance, for example the supplier of the device or a specialized installer, according to an access right profile «maintenance». The other devices of the installation to which this device belongs are not visible or controllable by this user Usr2".

In this case, the main user Usr1" can creates a secondary account Usr2" that he relates to a device D such as a boiler, with an access profile corresponding to the maintenance operations. Thus, a representative entity RE" may be related to the first user Usr1" via a first association A1". Attributes AttrA1", AttrB1", AttrC1", AttrD1" are defined for this association. In particular, the ownership flag attribute AttrA1" may have a true or activated value, indicating that the user Usr1' is owner of the device D corresponding to the representative entity RE1. Thus, the attribute AttrB1' may take on the value «boiler». The access rights profile attribute AttrC1" may take on a value indicating full access rights. The attribute AttrD1" may take on a false or deactivated value to indicate that the installation corresponding to the representative entity is not the default installation for the user Usr1".

The representative entity RE" may be related to a second user Usr2" via a second association A2". Attributes AttrA2", AttrB2", AttrC2", AttrD2" are defined for this association. In particular, the ownership flag attribute AttrA2" may have a false or deactivated value, indicating that the user Usr2' is not owner of the device corresponding to the representative entity RE". Thus, the attribute AttrB1" may take on the value «boiler of the user Usr1"». The access rights profile attribute AttrC1" may take one a value indicating full or partial access rights corresponding to maintenance. The attribute AttrD1' may take on a «false» or deactivated value to indicate that the installation corresponding to the representative entity RE" is not the default installation for the user Usr2". The two associations A1' and A2' may be active at the same time. Hence, a sharing of access to the device is achieved.

Configuration Method

First Implementation

Figure 6:
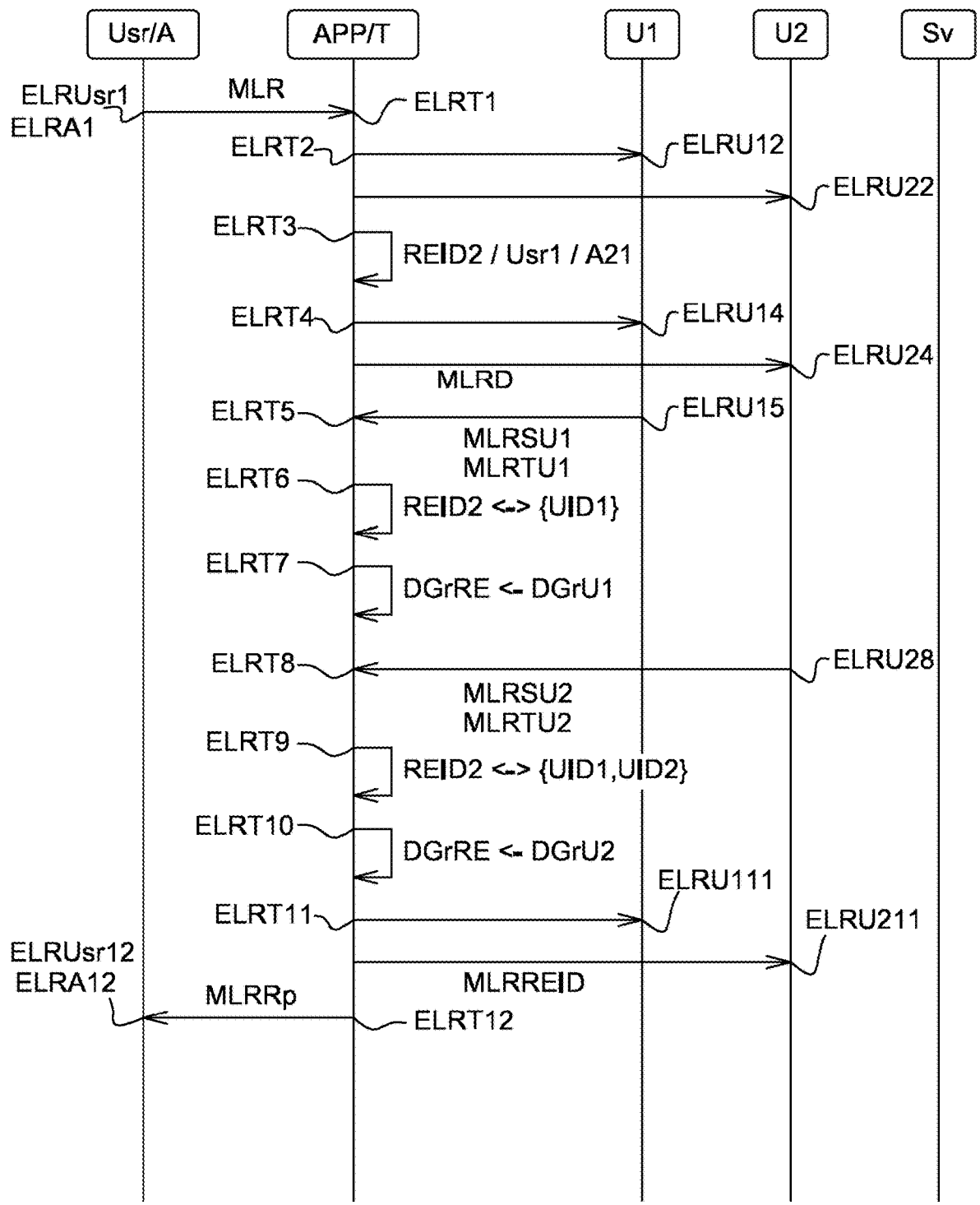
FIGS. 6, 7 and 8 are diagrams illustrating a first implementation of a configuration method of a home automation installation according to the invention.
Figure 7:
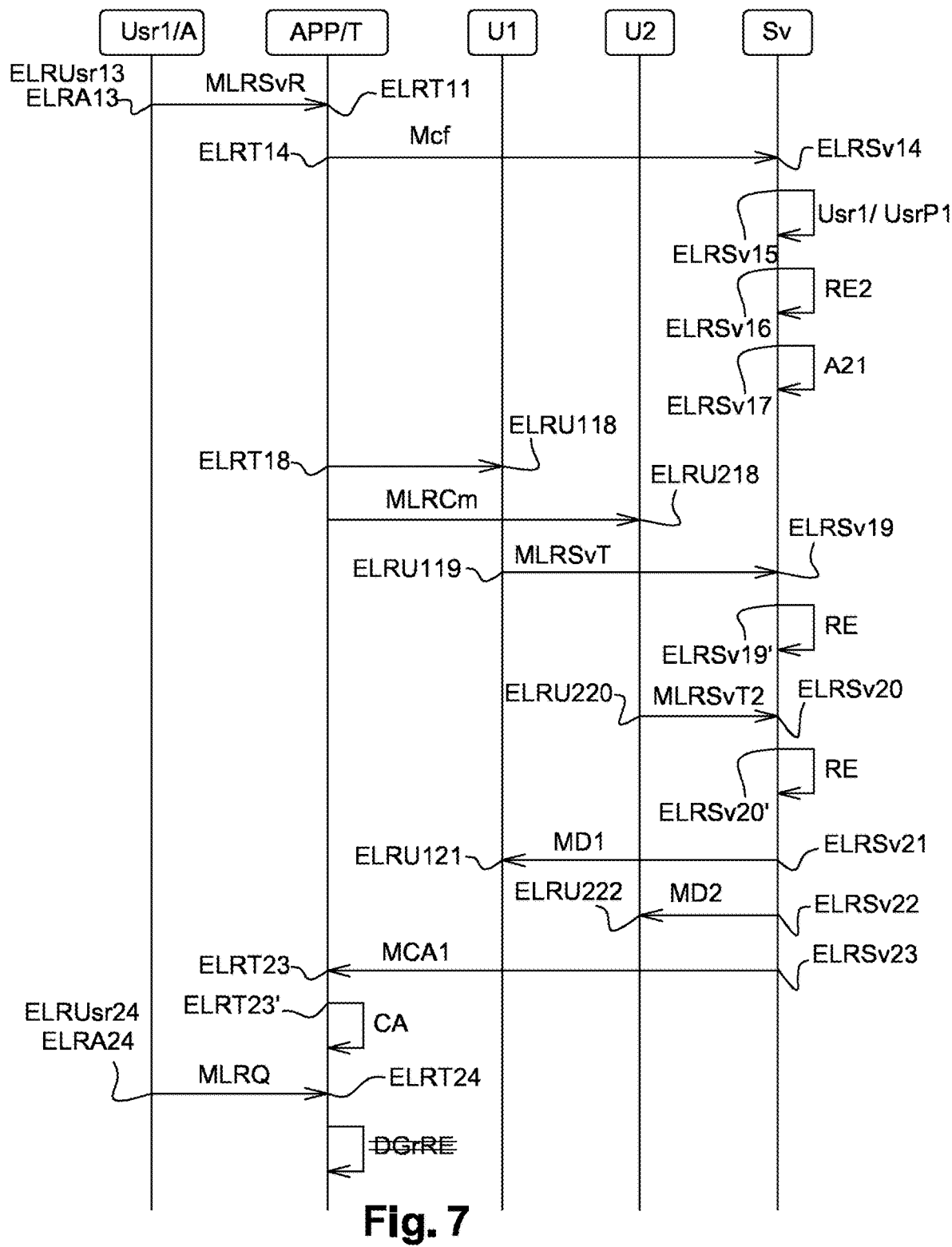

We will now describe a first embodiment of a configuration method of a home automation installation 17 with reference to FIGS. 6 and 7. We will herein consider an example in which the representative entity that is created corresponds to an entire installation 17 with two central control units U1 and U2. In particular, we will herein consider the configuration of a relationship set as previously described with reference to FIG. 5a, with a representative entity RE2, related by associations A21 and A22 respectively to two users Usr1 and Usr2. We will also suppose that the user Usr1 has a mobile user terminal T1, for example executing an application APP1, and that the user Usr2 has a mobile user terminal T2, for example executing an application APP2.

At a first step ELRT1, a message MLR or an instruction for initiating the registration or the configuration is received originating for example from a user or from a third-party application which emits or communicates this message or this instruction respectively at a step ELRUsr1 or ELRA1. Beforehand, the user may have launched the application APP and inputted his identifiers Usr1ID, for example a login and a password, these elements corresponding to an access right profile Attr21B.

These identifiers enable an authentication of the user. Indeed, the user terminals are not necessarily related to a natural person. Hence, it is necessary to check the identity of the user and ensure that the management unit could grant a sufficient confidence level to the user profile.

Thus, it is possible to ask the user, through the user terminal, to present one or several authentication factors such as a password or pin code, a biometric recognition element such as a fingerprint or pupillary imprint, or still a physical badge/token.

At a prior step ELRT2, the terminal is locally connected individually to the central control units U of the installation 17, using a local protocol, in particular a wireless protocol, such as for example a Bluetooth, Zigbee, or still Wifi type protocol, either directly, or via an access point which may integrate in this case a protocol gateway function (for example: Ethernet to Wifi/Bluetooth/Zigbee). The central control units U1 and U2 accept this connection respectively at steps ELRU21 and ELRU22. In the following, we will indifferently designate by terminal the terminal or the application APP executed on this terminal T.

The steps ELRT1 and ELRT2 may be interchanged, the connection may be established after reception of the instructions for initiating the registration.

At a third step ELRT3, an installation identifier REID is generated.

At a fourth step ELRT4, a discovery message MLRD to the central control units U1, U2 is sent, which is received by said central control units at respective steps ELRU14 and ELRU24. According to an embodiment, the discovery message may correspond to a «Bonjour», SSDP, UPNP type protocol.

During the discovery phase, the methods executed by the central control units and by the terminal may be launched in a coordinated manner by the user, for example by pressing on a dedicated button of the central control unit U1, U2 before launching the application APP on the terminal T. This press sets the central control unit U1, U2 in a «discovery mode» within a time interval, during which it responds to the messages sent by the terminal T. This procedure secures the pairing, by the proximity between the user and the central control unit U1, U2, and simplifies the transfer of identification data, because the user has not to manually enter serial numbers and certificates which are quite long. Indeed, the identifiers are unique for each central control unit U1, U2 produced by a manufacturer.

In the following, the first central control unit U1 sends, in response to the discovery message MLRD, at a step ELRU15, a signaling message MLRSU1 in connection with a first unique identifier UID1 of said first central control unit U1, which is received by the terminal at a step ELRT5. The first central control unit U1 also sends a topology description message MLRTU1 comprising a description of a group of devices DGrU1 related to the central control unit U1.

At a step ELRT6, it is proceeded with the attachment of the first identifier UID1 of the first central control unit U1 to the identifier of the installation REID and to the local registration of this attachment in the application APP on the terminal T.

At a step ELRT7, it is proceeded with the registration of the group of devices DGrU1 in connection with the identifier of the installation REID2 in a group of devices related to the installation DGrRE.

The second central control unit U2 also sends, in response to the discovery message MLRD, at a step ELRU28, a signaling message MLRSU2 in connection with a second unique identifier UID2 of said second central control unit U2, which is received by the terminal at a step ELRT8. The second central control unit U2 also sends a topology description message MLRTU2 comprising a description of a group of devices DGrU2 related to the central control unit U2.

For each device D, a central control unit can also communicate commands and parameters associated to these devices. The commands may be deduced by the terminal from the device type or still there may be present by default in the application on the terminal T, the list of devices serving to validate the use of these commands, if a device of this type is present.

At a step ELRT9, it is proceeded with the attachment of the second identifier UID2 of the second central control unit U2 to the identifier of the installation REID2 and to the local registration of this attachment in the application APP on the terminal T.

At a step ELRT10, it is proceeded with the registration of the group of devices DGrU2 in connection with the identifier of the installation REID in a group of devices related to the installation DGrRE.

Hence, the identifier of the installation REID2 of the home automation installation 17 is associated to a group UGrRE comprising at least the identifiers UID1, UID2 of the first central control unit U1 and of the second central control unit U2.

In the same manner, the identifier REID of the home automation installation 17 is associated to a group DGrRE of devices grouping together the devices contained at least in the first group DGrU1 of devices attached to the first central control unit U1 and at least in the second group DGrU2 of devices attached to the second central control unit U2.

Thus, the devices are considered as related to the same identifier of one installation, in a group which brings together all the devices of the installation related indifferently to the first or to the second central control unit which may be communicated to a user or to a third-party application.

It is possible to provide for an additional step ELRT11 in which a message MLRStID comprising the identifier REID2 of the home automation installation 17 is sent to the control units U1 and U2 related to said identifier REID, for its registration on the electronic control units U1, U2 at respective steps ELRU111 and ELRU211.

At this level, the local registration on the terminal may be considered as completed.

A feedback information to the user Usr or to a third-party application A may be communicated at a step ELRT12 in the form of a response message MLRRp which is received at a step ELRUsr12 or ELRA12 respectively.

It is also possible to proceed for the terminal, at the same step ELRT12 or before, with a presentation on the interface of the terminal T, an interface enabling the control or monitoring of the devices belonging to the group DGrRE, independently of their attachment to a central control unit U1 or U2.

The local registration may be spread out to the server Sv by carrying out the following steps, described in FIG. 7.

This propagation of the information may be automatic, or requested by a user or a third-party application at a step ELRUsr13 or ELRA13, the terminal receiving this instruction or this message MLRSvR at a step ELRT13.

The terminal T sends at a step ELRT14 a configuration message Mcf from a user terminal T regarding at least one access attribute Attr1 of a user Usr1 to at least one home automation device D of the installation 17. According to an example, the configuration message Mcf comprises the identifier of the installation REID2 and the identifiers of the associated central control units UID1, UID2 comprised in the group UGrRE, the server receiving this message at a step ELRSv14.

The information regarding the identifiers of the installation and of the user may be explicit, for example contained in the configuration message Mcf.

Alternatively, this information may be implicit. As example, it is possible to use the source IP address of the message originating from a central control unit U in order to define the identifier of the installation if this installation comprises one single central control unit.

It is also possible to use a reference to an installation identifier or to another central control unit in the case where the installation comprises several central control units.

A connection with the terminal may be determined by the input of a login and a password, or a PIN code which allows identifying the user Usr1.

The terminal T may also send the data relating to the devices related to the identifier REID2 of the group DGrRE for the constitution of this representative entity.

At a step ELRSv15, the server Sv verifies the existence of a user profile UsrP1 corresponding to the concerned user Usr1 in a users repository UsrRf or creates a new user profile UsrP1 corresponding to the concerned user Usr1 in the case of an absence of a user profile in the users repository UsrRf. In the case where a new user profile UsrP1 is created, the latter is saved in the users repository UsrRf.

At a step ELRSv16, the server Sv verifies the existence of a representative entity RE2 corresponding to the installation 17 in a representative entities repository RE2 or creates a new representative entity in the case of an absence of a representative entity in the representative entities repository RERf. In the case where a new representative entity RE is created, the latter is saved in the users repository RERf. In the considered example, we will suppose that the representative entity does not exist. Hence, in this case, the server creates a new representative entity of the installation 17, using in particular the identifiers of the two central units UID1 and UID2.

At a step ELRSv17, the server Sv verifies the existence of an association A between the user profile UsrP1 and the representative entity RE2 in an associations repository ARf in order to update access attributes Attr of the association A or creates a new association A between the at least one user Usr1 and the at least one representative entity RE, the at least one access attribute Attr being related/assigned to said association. In the case where a new association RE is created, the latter is saved in the users repository ARf.

In the considered example, we will suppose that the association A21 did not exist beforehand, such an association is therefore created.

Moreover, at a step ELRT18, the terminal T sends a communication request message MLRCm to central control units U1 and U2 related to the identifier of the installation REID, for the establishment of a communication by the central control unit U to the server Sv in order to communicate to the server Sv information relating to said central control unit U and optionally to a description of the group of devices DGrU1, DGrU2 related to the central control unit U1, U2, but also for collecting commands originating from the server Sv.

In particular, this step may correspond to a TCP/IP connection establishment request from the central control units U to the server Sv, upon an order of the user.

The order of the steps ELRT14 and ELRT18 is indifferent.

The actual completion of the communications between the central control units U1, U2, is represented in the drawing by the steps ELRU119/ELRSv19 and ELRU220/ELRSv20 respectively. During these communications, the central control units send to the server application messages containing their identifier UID1 or UID2, and optionally the list of the devices that it can pilot, possibly the commands acknowledged by each device/device type and the parameters/state variables associated to these devices.

In order to reinforce the security of the creation of the representative entity RE corresponding to the defined home automation installation, the server Sv may determine this creation by the reception within a predefined time interval of the message MLRSvR originating from the terminal T, and of the application messages originating from the central control units U1, U2.

Thus, updates of the information regarding the devices associated to the installation are performed by messages that we will designate, in a generic manner, as a topology description message MLRSvT. It may consist of the addition or deletion of a device related to a central control unit, parameters changed during a connection of the user in a local mode, etc. Thus, a user who connects via Internet to his home automation installation via the server Sv has an updated «insight» over the installation.

According to one variant, it is also possible that all the information relating to the central control units U1, U2 and optionally to a description of the groups of devices DGrU1, DGrU2 related to the central control unit U1, U2 are collected on the terminal T1, and then communicated to the server at step ELRsv14 or at a subsequent step.

At a subsequent step ELRSv21, respectively ELRSv22, the server can send a distribution message MD1, respectively MD2, regarding the creation or the update of the at least one association to the central control units U1, U2 belonging to the installation 17 corresponding to the representative entity RE2 concerned by the association A21. These messages are received respectively at the steps ELRU121 and ELRU222. These arrangements allow providing an access control on the basis of the access attributes locally on the central control unit.

Moreover, at a step ELRSv23, the server Sv can determine a display configuration CA regarding at least one command on at least one home automation device D which may be triggered by a user and/or at least one state variable S of a home automation device which may be visualized by a user Usr1 according to the at least one access attribute, and then proceed with the sending of at least one display configuration message MCA regarding said display configuration CA to a user terminal T. These arrangements allow providing a display on the terminal adapted to the access attributes of a user. The display configuration CA is applied at a step ELRT23'.

During the disconnection of the application, requested by the user Usr1 at a step ELUsr24/ELRA24 by an exit request or instruction MLRQ, the terminal T proceeds, at a step ELRT24, with the closure of the connection between the user terminal T and the central control units U1, U2, and with the invalidation of the registration of the group of devices related to the installation DGrRE, the registration of the attachment of the at least one identifier UID of the at least one central control unit to the identifier of the installation REID being preserved.

During a new connection to the application, a new discovery will be carried out by the application, but while already knowing the identifiers UID1, UID2 of the central units related to the installation identifier REID.

All it needs is that the central units send back the topology description messages MLRTU1, MLRTU2. These arrangements allow having an updated insight over the installation.

In the case of an installation comprising several central control units, the fact of representing the home automation installation by a representative entity associated to a group of home automation devices belonging to the installation allows presenting to the user an interface comprising an abstraction layer for hiding the actual attachment of the devices to the central control units. Thus, the interface represents the pilotable home automation equipment, such as the shutters, awnings, HVAC or lighting systems, in the installation as well as the sensors in presence. These arrangements may be obtained without any communication between the central control units, but simply by the logical attachment operated during the configuration.

Figure 8:
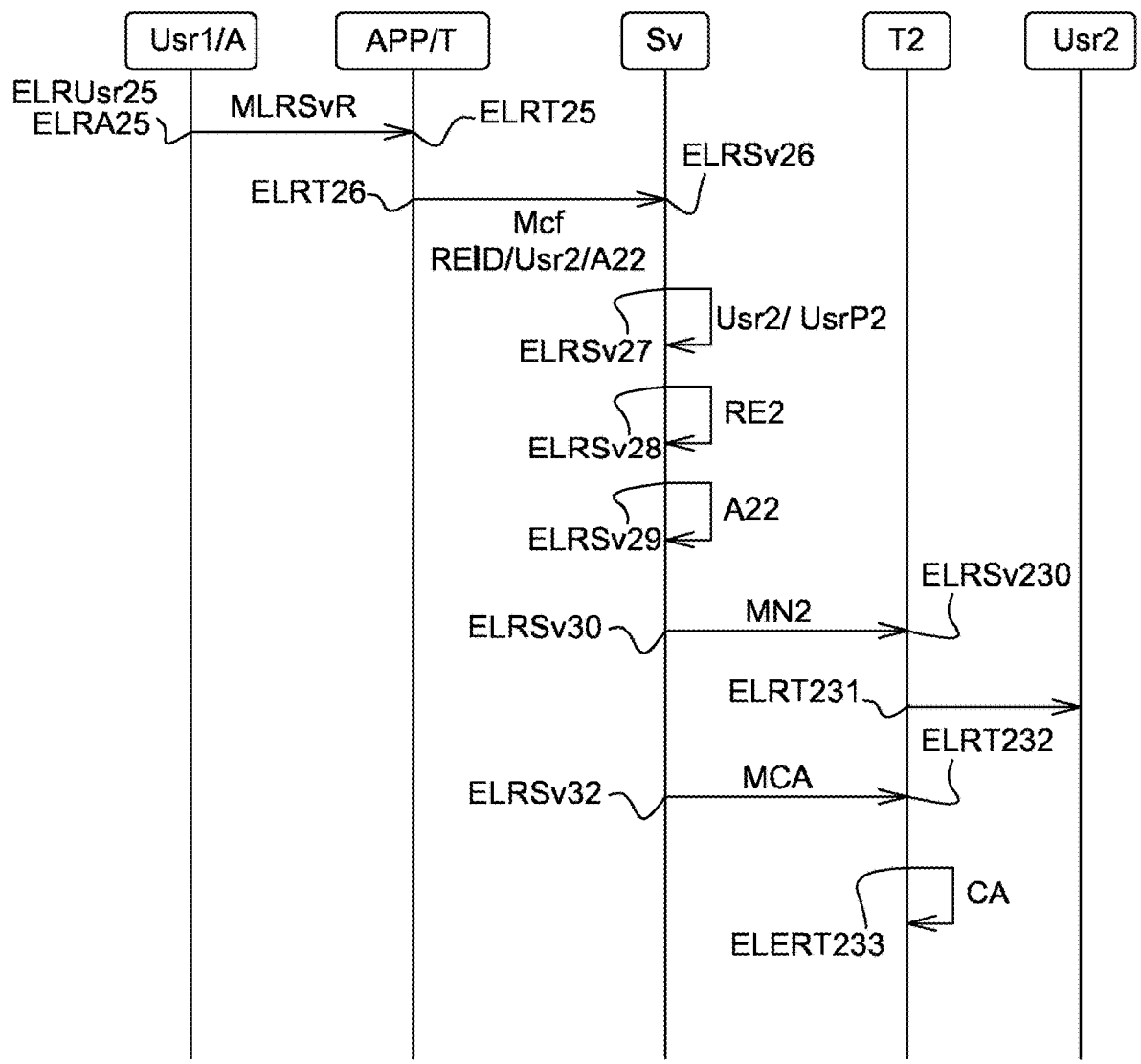

Continuation of the First Implementation: Creation of an Access for a Second User During a subsequent phase represented in FIG. 8, the user Usr1 can decide to proceed with the creation of an account for a user Usr2 and to enable an access to the home automation installation 17 represented by the representative entity RE2. Access attributes AttrA2, AttrB2, AttrC2, AttrD2 may be defined in connection with the access of the second user to the installation. A validity period VP22 may also be specified for this access.

This configuration may be requested by a user Usr1 or a third-party application at a step ELRUsr25 or ELRA25, the terminal receiving this instruction or this message MLRSvR at a step ELRT25.

At a step ELRT26, the terminal T sends a configuration message Mcf; the at least one configuration message regarding the access attributes AttrA22, AttrB22, AttrC22, AttrD22 of the second user Usr2 to the installation 17. According to an example, the configuration message Mcf comprises the identifier of the installation REID2, the server receiving this message at a step ELRSv26. Alternatively, the configuration message MCf for the creation of the second association may be sent on the initiative of the second user Usr2, subject to a validation of the first user, or in a «guest» mode characterized by a predefined access attribute Attr2.

At a step ELRSv27, the server Sv verifies the existence of a user profile UsrP2 corresponding to the concerned user Usr2 in a users repository UsrRf. In the absence of such a profile, the server Sv creates a new user profile UsrP2 corresponding to the concerned user Usr2 in the case of an absence of a user profile in the users repository UsrRf. In the case where a new user profile UsrP2 is created, the latter is saved in the users repository UsrRf.

At a step ELRSv28, the server Sv verifies the existence of a representative entity RE in a representative entities repository. In the absence of such an entity, the server Sv creates a new representative entity in the case of an absence of a representative entity in the representative entities repository RERf. In this instance, the representative entity RE2 of the home automation installation has been created beforehand, and is therefore selected by the server Sv.

At a step ELRSv29, the server Sv verifies the existence of an association A between the at least one user and the at least one representative entity in an associations repository ARf in order to update access attributes Attr of the association A. In this instance, there is no association between the user Usr2 and the representative entity RE. Hence, a new association A22 is created between the at least one user Usr1 and the at least one representative entity RE2 while taking into account the access attributes AttrA22, AttrB22, AttrC22, AttrD22. Afterwards, the new association A22 is saved in the users repository ARf.

The new association A22 may be associated to a validity period VP22 as described with reference to the first example hereinabove.

At a subsequent step which is not represented, the server Sv can send a distribution message in a similar manner as at steps ELRSv21 or ELRSv22, regarding the creation or the update of the association A22 to central control units U1, U2 belonging to the installation 17. These arrangements allow providing an access control on the basis of the access attributes locally on the central control unit. In particular, a user «guest» can use a user terminal as a control point. In particular, the user terminal can communicate with the central control unit according to an open protocol such as for example Wifi, Bluetooth, Zigbee. The control unit can apply access filters and communicate with the home automation devices according to a proprietary protocol. In this case, the central control unit can identify the user thanks to his user terminal, but the home automation devices do not have to know the user.

According to one possibility, the same user «guest» can use proprietary control points, such as for example a remote control. This use may be limited or prohibited by the central control unit or on the initiative of the management unit, which may send a block message to the home automation devices.

An example of use is a temporary delegation of use. The devices receive the commands emitted by the proprietary remote controls and may execute them or not depending on the received block messages. It is not necessary that the home automation devices or even the management unit be capable of identifying the user.

At a step ELRSv30, the server may proceed with a notification MN2 of a second user terminal T2 under responsibility of the second user to inform him on the opening of access rights corresponding to the association A22. This notification is received by the second terminal at a step ELRT230. The second terminal T2 may display this information to the second user at a step ELRT231.

Moreover, at a step ELRSv32, the server Sv can determine a display configuration CA2 regarding at least one command on at least one home automation device D which may be triggered by the user Usr2 and/or at least one state variable S of a home automation device which may be visualized by the user Usr2 according to the access attributes of his user profile, and then proceed with the sending of at least one display configuration message MCA2 regarding said display configuration CA2 to a user terminal T2. These arrangements allow providing a display on the terminal T2 adapted to the access attributes of the user Usr2. The display configuration CA is applied at a step ELRT233.

Second Implementation

Figure 9:
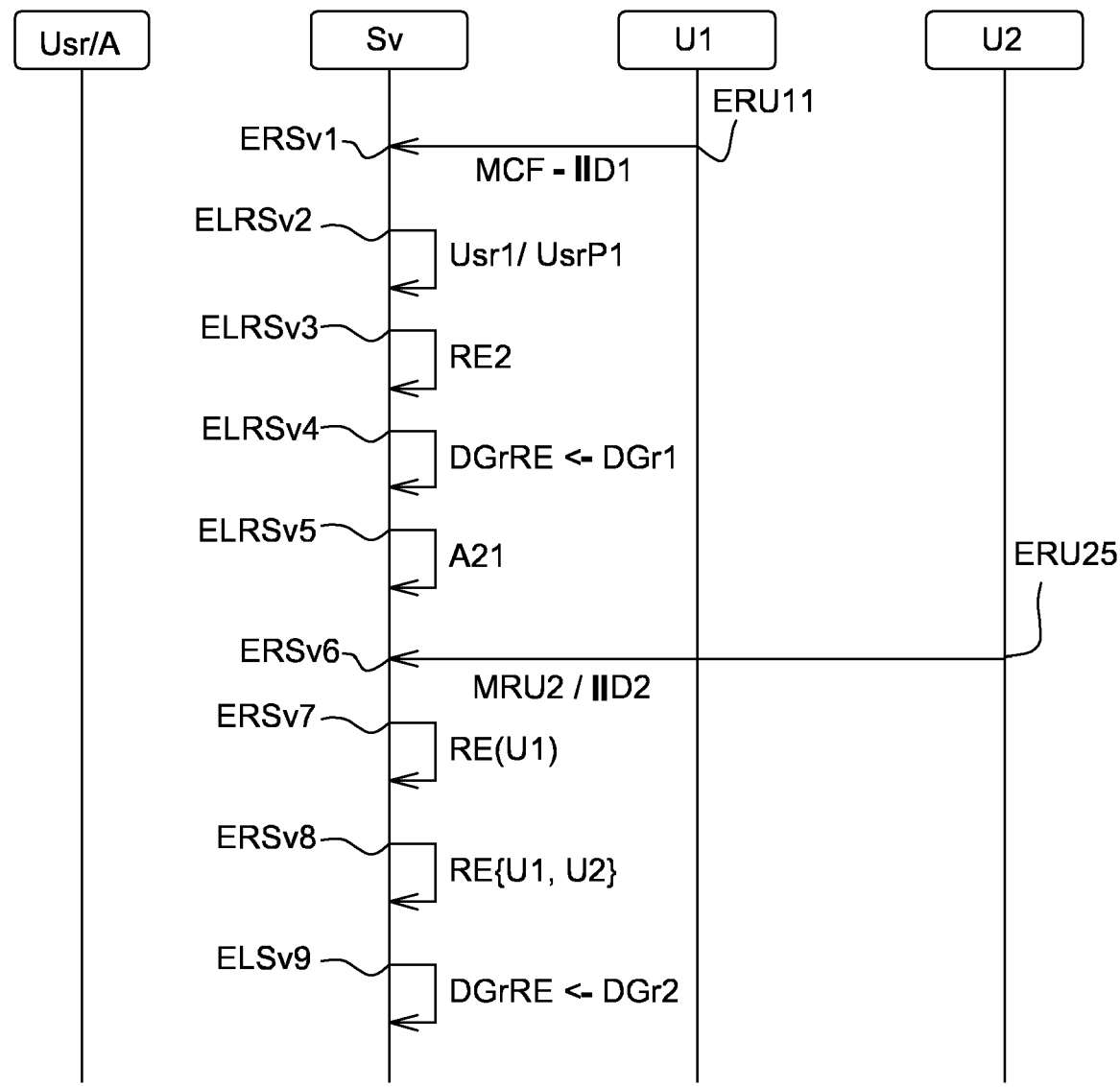
FIG. 9 is a diagram illustrating a second implementation of a configuration method of a home automation installation according to the invention.

We will now describe a second implementation of a configuration method of a home automation installation 17 with reference to FIG. 9, the configuration information being no longer communicated by a user terminal but rather by at least one central control unit.

At a first step ERSv1, the server Sv receives a configuration message MCF of a first central control unit U1 for the installation 17, emitted at a step ERU11 by a first central control unit U1, on the basis of an identification information IID1, the at least one configuration message Mcf' regarding at least one access attribute Attr1 of a user Usr1 to at least one home automation device D of the installation 17.

For example, the identification information may correspond to an identifier of a central control unit already belonging to a representative entity, and/or to an identifier of the user UsrID under the responsibility of whom the registration is performed and/or directly to an identifier of a representative entity of an installation. The identification information may be contained in the message or be deduced from the context, for example from a network address emitter of the message, or still from characteristics relating to the communication session.

At a step ERSv2, the server Sv verifies the existence of a user profile UsrP1 corresponding to the concerned user Usr1 in a users repository UsrRf. In the absence of such a profile, the server Sv creates a new user profile UsrP1 corresponding to the concerned user Usr1, and then saves it in the users repository UsrRf.

At a step ERSv3, the server Sv verifies the existence of a representative entity RE in a representative entities repository. In the considered case, supposing that such an entity does not exist, the server Sv creates a new representative entity RE2, and then saves it in the users repository RERf. In particular, the server obtains an information REI1 on the attachment of the first central control unit U1 to a representative entity RE2 of a home automation installation 17. If the attachment information corresponds to an absence of information regarding an attachment of the central control unit U1 to an installation 17 saved before, the server proceeds with the creation of a representative entity of the installation 17 and attaches the first central control unit U1 to this representative entity RE2. This is in particular the case during the registration of a first central control unit U1 of a given installation.

In the case where a central control unit U is already paired with one or several device(s) D of a group DGrU1, the representative entity RE2 is updated at a fourth step ERSv4 so as to represent these devices in the group of devices DGrRE attached to the representative entity of the installation 17. Thus, the group of devices DGrRE is updated. The information necessary to the update of the representative entity RE may be present in the message MRU2, or be the object of additional exchanges with the server Sv in order to obtain identification elements of the concerned devices D.

At a step ERSv5, the server Sv verifies the existence of an association A between the at least one user and the at least one representative entity in an associations repository ARf and updates access attributes Attr of the association A. In the considered example, we will suppose that the association A21 does not exist. In this case, the server Sv creates a new association 21 between the at least one user Usr1 and the at least one representative entity RE2, the access attributes AttrA21, AttrB21, AttrC21, AttrD21 being related to said association. Afterwards, the association A21 is saved in the users repository ARf.

At a subsequent step ERSv6, the server Sv receives a message MRU2 for requesting registration of a second central control unit U2 for the installation 17, emitted at a step ERU25 by a second central control unit U2, or alternatively by a user terminal T, on the basis of an identification information IID2 and in connection with the same user Usr1.

As already seen, the identification information may correspond for example to an identifier of a central control unit already belonging to a representative entity, and/or to an identifier of the user UsrID under the responsibility of whom the registration is performed.

At a step ERSv7, the server Sv proceeds with the obtainment of information StI2 on the attachment of the second central control unit U2 to a representative entity RE of a home automation installation 17. In this instance, the message MRU2 comprises, as identification information, an identifier UID1 of the first central control unit U1 in order to specify that the two central control units U1 and U2 belong to the same installation, this information being possibly combined with a user identifier UID1.

At a seventh step ERSv8, the server Sv proceeds with an attachment of the second central unit to a representative entity RE of the installation 17 to which is also related the first central control unit U1 for the same user UID1.

In the case where the central control unit U2 is already paired with one or several device(s) D of a group DGrU2, the representative entity RE is updated at an eight step ERSv9 so as to represent these devices in the group of devices DGrRE attached to the representative entity of the installation 17. Thus, the group of devices DGrRE is updated. The information necessary to the update of the representative entity may be present in the message MRU2, or be the object of additional exchanges with the server Sv in order to obtain identification elements of the concerned devices D.

Thus, the central control units U1 and U2 are considered as related to the same representative entity RE of an installation, which brings together all the devices D of the installation related indifferently to the first or to the second central control unit in the same group DGrRE which may be communicated to a user terminal T. These arrangements are obtained without any communication between the central control units, but simply by the logical attachment operated during the registration.

Thus, the interface presented to the user may add an abstraction layer for hiding the actual attachment of the devices to the central control units U. Thus, the interface represents the pilotable home automation equipment, such as the shutters, awnings, HVAC or lighting systems, in the installation as well as the sensors in presence.

Thus, though the devices D are related to a representative entity of the installation, the information on the attachment of the home automation devices D to the central control units U are nonetheless transmitted to the server Sv, for integration in the data structure, for routing of the messages to the concerned central control unit in the case of control by the server Sv. In particular, the identifier of the central control unit to which a product is related may be contained in the identifier DURL.

A central control unit U may be detached from the representative entity RE of an installation. When a central control unit U is detached, all the devices that are managed via the central control unit are deleted from the group DGrRE of devices of the representative entity RE of the installation 17. Thus, it is possible to provide for a central unit not being detached if the representative entity RE comprises dependencies on the devices D managed by this central control unit U, such as scenarios. These dependencies should be deleted before the central control unit U could be detached, whether manually or automatically by the server Sv.

In the case of pairing of a new device D to a central control unit U, or on the contrary the deletion of a device, or still its modification, an update message is sent to the server Sv in order to also update the list of devices DGrRE dependent on the representative entity RE.

Hence, thanks to this registration method, the server Sv can propose a description of the installation 17 on the interface IN, thanks to the use of the representative entity in the form of a group of devices D, contained in the group of devices DGrRE, which present state variables S but also available commands C.

Thus, it is possible to control and monitor via the interface all the devices of the installation independently of their attachment to the central units U.

Subsequently to the above-described steps, steps of creating a second access for a second user, distributing information throughout the central units or generating an interface configuration may be implemented in a similar manner as described with reference to the first implementation Variant of the Configuration Methods The above-described first and second implementations of a configuration method concern representative entities of an installation comprising two central control units. Of course, it is also possible to implement the method in the case of an installation comprising one single central control unit.

Moreover, it is possible to implement the method in the case of an installation comprising more than two central control units for the same installation.

Monitoring Method

First Example of Implementation—Control

A first example of implementation of a monitoring method according to the invention is now described with reference to FIG. 10. We will suppose that the steps of a configuration method as previously described with reference to FIGS. 6 to 9 have been completed before, so as to obtain a configuration of representative entities, of users and of associations as represented in FIG. 5*a*.

At a step ECSv1, the server receives a control message MC originating from a user terminal T1 held by a user Usr1, the control message regarding a user Usr1 and at least one home automation device D of the installation 17.

We will suppose that the control message MC contains a request for executing a command, in particular a grouped command corresponding to a first command C1 intended to a first home automation device D1 under the control of a first central control unit U1, and a second command C2 intended to a second home automation device D2 related to a second central control unit U2, the control units U1 and U2 belonging to an installation 17 represented by a representative entity RE2.

Subsequently to the reception of the control message, the server Sv selects a user profile UsrP1 corresponding to the user Usr1 in a users repository UsrRf at a step ECSv2.

The server also selects a representative entity RE2 corresponding to the devices concerned by the commands C1 and C2 in a representative entities repository at a step ECSv3.

Finally, at a step ECSv4, the server Sv selects an association A21 between the user Usr1 and the representative entity RE2 of the installation concerned by the control message in the associations repository ARf.

On the basis of the selected association A21, it is possible to determine the access attributes of the user Usr1 on the installation 17 represented by the representative entity A21.

In this instance, in continuation of the example of FIG. 5*a*, it appears that the user Usr1 is owner of the installation, as indicated by the attribute AttrA21. The access rights profile attribute AttrC21 indicates full access rights.

Consequently, at a step ECSv5, the server can determine one or several action(s) Ac to carry out according to the control message MC and the access attributes AttrA21 to AttrD21.

In the case of the example of FIG. 5*a*, the access right profile provides authorization for the user to execute the command C1 on the device D1 and the command C2 on the device D2. Consequently, the action Ac corresponds to sending a message to the first central unit U1 in order to trigger a first command C1 on the first device D1 and sending a message to the second central unit U2 in order to trigger a second command C2 on the second device D2.

Thus, at a step ECSv6, a first control message MC1 is sent to the first central control unit U1 for the completion of the command C1.

In the represented example, we suppose that the feedback of this first command corresponds to a success of the completion of the command C1 with a feedback code RC1, sent by the central control unit U1 at a step ECU17. The server Sv may store this success value.

At a step ECSv8, a second control message MC2 is sent to the first central control unit U2 for the completion of the command C2.

In the represented example, we suppose that the feedback of this second command corresponds to a success of the completion of the command C2 with a feedback code RC2, sent by the central control unit U2 at a step ECU29. The execution service may store this success value.

At a step ECSv10, the server Sv defines a response RC to send back to the user subsequently to the control message MC.

Since a feedback code has been received for each executed command, the results should be aggregated so as to simulate an overall result for the grouped command. In particular, the grouped command is considered to be completed if all the commands C1, C2 have been carried out successfully, and to have failed if one or several command(s) have failed.

In the case illustrated in FIG. 7, the grouped control may be considered to be successful.

This response is communicated to the user Usr1 or to the application App1 which receives it at a step ECUsr10 or ECA10.

According to one variant, the feedback codes of the commands may be notified progressively with the completion of the commands to the user or to the application.

Second Example of Implementation—Control

A second example of implementation of a monitoring method according to the invention is now described with reference to FIG. 11. We will suppose that the steps of a configuration method as previously described with reference to FIGS. 6 to 9 have been completed before, so as to obtain a configuration of representative entities, of users and of associations as represented in FIG. 5*a*.

At a step ECSv1', the server receives a control message MC originating from a user terminal T held by a user Usr2, the control message regarding a user Usr2 and at least one home automation device D of the installation 17.

We will suppose that the control message MC contains a request for executing a command, in particular a grouped command corresponding to a first command C1 intended to a first home automation device D1 under the control of a first central control unit U1, and a second command C2 intended to a second home automation device D2 related to a second central control unit U2, the control units U1 and U2 belonging to an installation 17 represented by a representative entity RE2.

Subsequently to the reception of the control message, the server Sv selects a user profile UsrP2 corresponding to the user Usr2 in a users repository UsrRf at a step ECSv2'.

The server also selects a representative entity RE2 corresponding to the devices concerned by the commands C1 and C2 in a representative entities repository at a step ECSv3'.

Finally, at a step ECSv4', the server Sv selects an association A22 between the user Usr2 and the representative entity RE2 of the installation concerned by the control message in the associations repository ARf.

On the basis of the selected association A22, it is possible to determine the access attributes of the user Usr2 on the installation 17 represented by the representative entity RE2.

In this instance, in continuation of the example of FIG. 5*a*, it appears that the user Usr2 is tenant of the installation, as indicated by the attribute AttrA22. The access rights profile attribute AttrC22 indicates limited access rights.

Consequently, at a step ECSv5', the server can determine one or several action(s) Ac to carry out according to the control message MC and the access attributes AttrA22 to AttrD22.

In the case of the example of FIG. 5a, the access right profile does not provide authorization for the user to execute the command C1 on the device D1 but provides authorization to execute the command C2 on the device D2.

Consequently, the action Ac corresponds to:
sending a message to the user or to the application APP1 indicating an error message ME or to an error storage ERC1 at a step ECSv6'; and
sending a message to the second central unit U2 in order to trigger a second command C2 on the first device D2.

At a step ECSv7', a control message MC2' is sent to the first central control unit U2 for the completion of the command C2.

In the represented example, we suppose that the feedback of this second command corresponds to a success of the completion of the command C2 with a feedback code RC2, sent by the central control unit U2 at a step ECU29'. The server Sv may store this success value.

At a step ECSv9', the execution service defines a response RC to send back to the user subsequently to the control message MC.

Since a feedback code has been received for each command executed or generated for the unauthorized commands, the results should be aggregated so as to simulate an overall result for the grouped command. In particular, the grouped command is considered to be completed if all the commands C1, C2 have been carried out successfully, and to have failed if one or several command(s) have failed.

In the case illustrated in FIG. 7, the grouped command may be considered to have failed.

This response is communicated to the user Usr1 or to the application App1 which receives it at a step ECUsr9' or ECA9'.

According to one variant, the feedback codes of the commands may be notified progressively with the completion of the commands to the user or to the application.

Variant of the Monitoring Method

Figure 10:
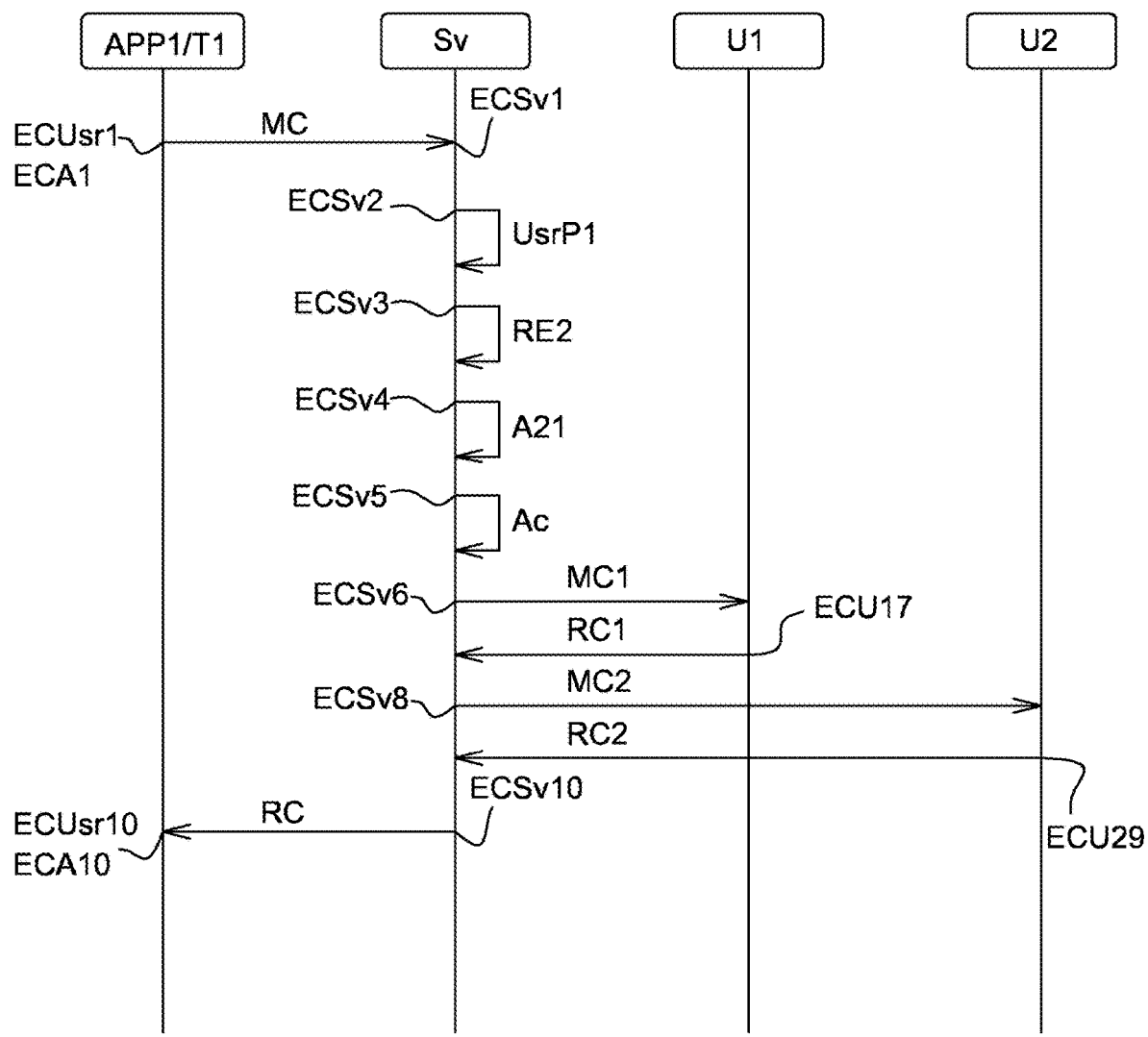
FIG. 10 is a diagram illustrating an implementation of a monitoring method of a home automation installation according to the invention.
Figure 11:
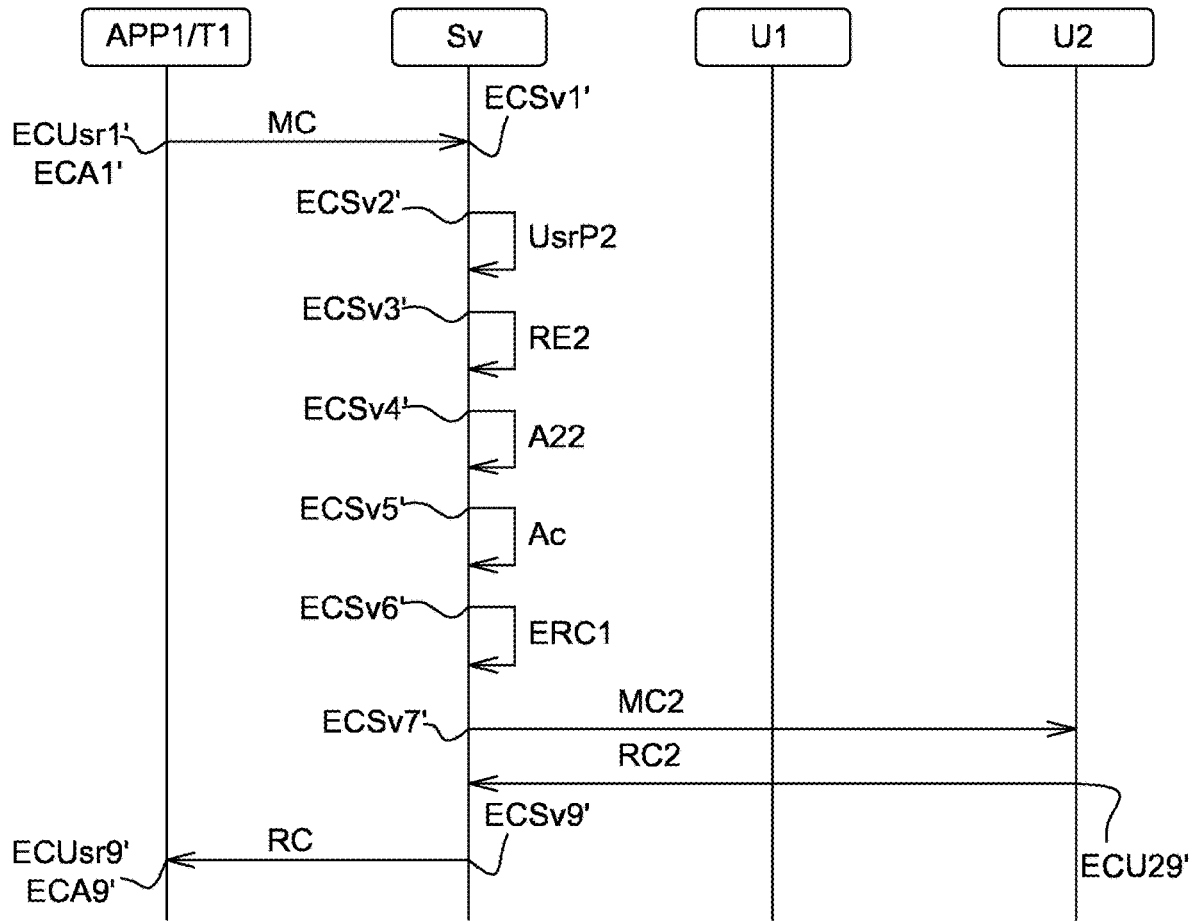
FIG. 11 is a diagram illustrating a second implementation of a monitoring method of a home automation installation according to the invention.

According to a variant of the first and second examples of implementation described in FIGS. 10 and 11, a prerecorded scenario may be triggered instead of a command or a grouped command.

Moreover, FIGS. 10 and 11 illustrate the case of a grouped command. Nonetheless, these same examples apply to the case of one single command.

According to a variant of the first and second examples of implementation described in FIGS. 10 and 11, the steps ECSv1 to ECSv10 or respectively ECSv1's to ECSv9' of the monitoring method implemented by the server may be implemented by a central control unit as regards commands of devices related to said central control unit. In this case, the terminal locally connects to the central control unit, and a distribution of the information regarding the associations between a representative entity and one or several user(s) should have been carried out between the server and the concerned central control unit.

Third Example of Implementation—State Monitoring or Display Configuration

Figure 12:
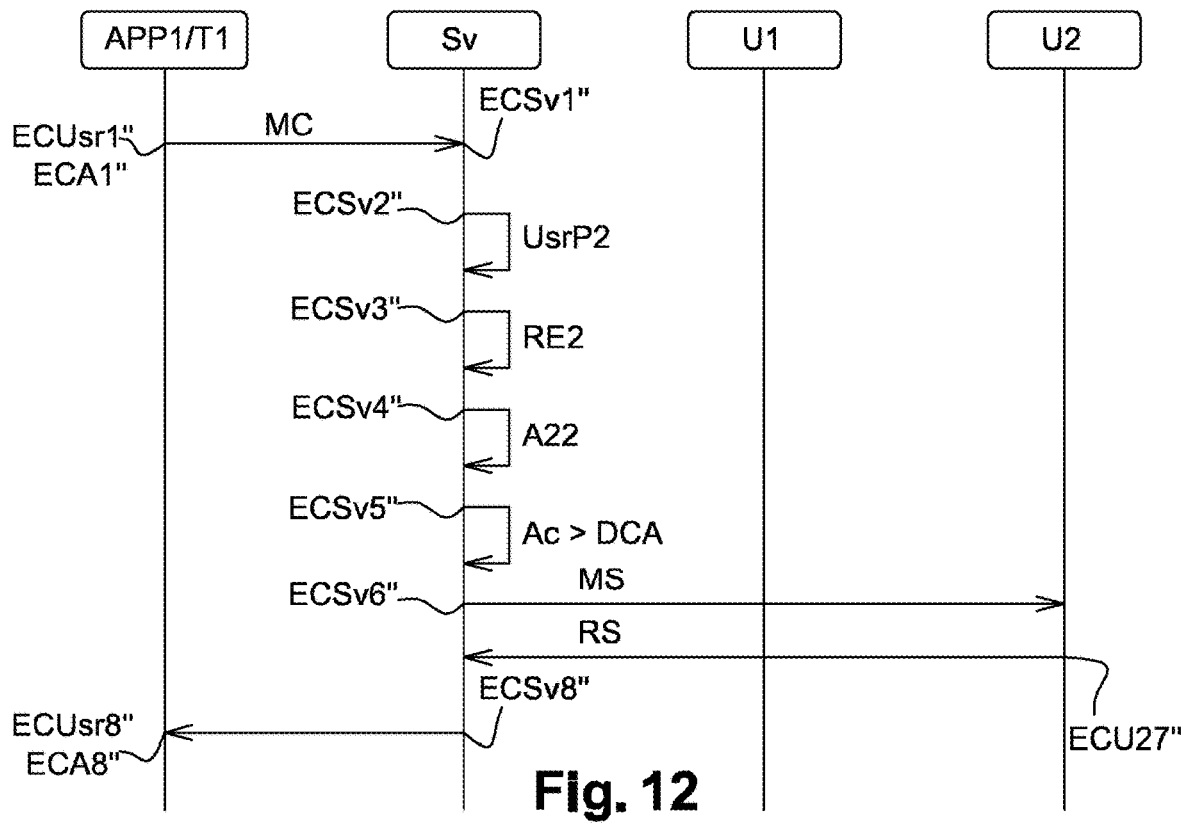
FIG. 12 is a diagram illustrating a third implementation of a monitoring method of a home automation installation according to the invention.

A third example of implementation of a monitoring method according to the invention is now described with reference to FIG. 12. We will suppose that the steps of a configuration method as previously described with reference to FIGS. 6 to 9 have been completed before, so as to obtain a configuration of representative entities, of users and of associations as represented in FIG. 5a.

At a step ECSv1", the server receives a control message MC corresponding to a connection of a user terminal T1 held by a user Usr1 to the server Sv or to the reception of an indication that a connection with the user terminal T is established. The control message may also correspond to a request for updating or refreshing the display.

The control message corresponds to a display configuration request.

Subsequently to the reception of the control message, the server Sv selects a user profile UsrP1 corresponding to the user Usr1 in a users repository UsrRf at a step ECSv2".

The server also selects a representative entity RE2 corresponding to the devices concerned by the commands C1 and C2 in a representative entities repository at a step ECSv3".

Finally, at a step ECSv4", the server Sv selects an association A21 between the user Usr1 and the representative entity RE2 of the installation concerned by the control message in the associations repository ARf.

On the basis of the selected association A21, it is possible to determine the access attributes of the user Usr1 on the installation 17 represented by the representative entity A21.

In this instance, in continuation of the example of FIG. 5a, it appears that the user Usr1 is owner of the installation, as indicated by the attribute AttrA21. The access rights profile attribute AttrC21 indicates full access rights.

Consequently, at a step ECSv5", the server can determine one or several action(s) Ac to carry out according to the control message MC and the access attributes AttrA21 to AttrD21. In particular, in the case of a display configuration request, the server determines a display configuration DCA defining the interface elements that should be displayed on the user interface of the terminal T1.

The display configuration DCA defines, according to the access attributes Attr of the association A relating a given user Usr and a representative entity RE, the interface elements corresponding to:
the commands C, grouped commands, scenario that can be triggered by a user Usr, and/or
the values of the state variables S of the home automation devices D that can be visualized by a user Usr according to the at least one access attribute.

A default association for a user connected via the user terminal T may also be defined according to the attributes Attr of the associations related to the user Usr1.

At a step ECSv6", the server can interrogate the central control units U1, U2 to obtain values of state variables S which will be sent back thereto at a step ECU27". Alternatively, it is also possible that the server Sv interrogates an instances database storing the values of the state variables S of the devices D. In FIG. 12, only one request is represented to a central control unit U. Nonetheless, it is possible that several requests be sent to several central control units U1, U2.

The, at a subsequent step, the server Sv sends at least one display configuration message DCA to the terminal T1.

Messages may be sent periodically in order to refresh the display of the terminal. Thus, the user terminal can display an interface presenting to the user the devices and their states or the available commands by applying, at the level of the management unit, a filter corresponding to the at least one access attribute Attr1C.

These arrangements correspond to an active supervision mode, in which the user terminal T1 sends a message corresponding to an explicit request regarding the state of one or several home automation devices to the server Sv. The server Sv communicates the values of the state variables while taking into account a filter corresponding to the access rights profile attribute Attr21C associated to the user Usr1.

Supervision Method

Figure 13:
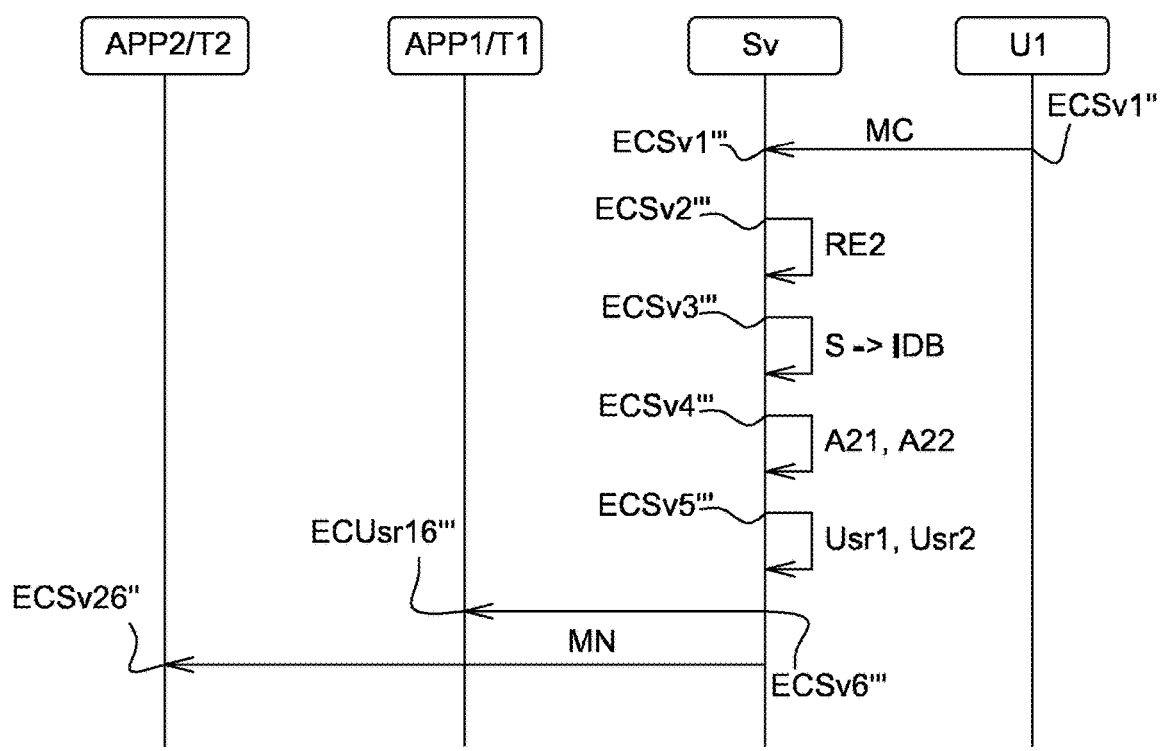
FIG. 13 is a diagram illustrating an implementation of a supervision method of a home automation installation according to the invention.

An example of implementation of a supervision method according to the invention is now described with reference to FIG. 13. We will suppose that the steps of a configuration method as previously described with reference to FIGS. 6 to 9 have been completed before, so as to obtain a configuration of representative entities, of users and of associations as represented in FIG. 5a.

At a step ECSv1''', the server receives a state notification message MS originating from a central control unit U1 of a home automation installation 17 containing an indication regarding at least one state variable S of a home automation device D.

At a step ECSv2''', the server selects a representative entity RE2 corresponding to the concerned device D in a representative entities repository at a step ECSv2''.

At a step ECSv3''', the server can carry out an update of a value corresponding to the state variable in an instances repository, in order to hold this value for a subsequent use, for example to respond to an update request originating from a terminal T as described in the previously-described third implementation of the monitoring method.

Afterwards, at a step ECSv4''', the server Sv selects the associations A21 and A22 involving the representative entity RE2 of the installation concerned by the control message in the associations repository ARf.

The server Sv selects the user profiles UsrP1, UsrP2 corresponding to the users concerned by the associations A21 and A22 identified beforehand in a users repository UsrRf at a step ECSv5'''.

On the basis of the selected associations A21, A22, it is possible to determine the access attributes of the users Usr1, Usr2 on the installation 17 represented by the representative entity RE2 and thus determine whether they are authorized to receive notifications regarding the state variable S. Thus, the server can communicate the values of the state variables while taking into account a filter corresponding to the access attributes associated to the user for the considered device.

In this case, we will suppose that the two users Usr1 and Usr2 are authorized by their access profiles Attr1C and Attr2C to visualize the values of the state variable S.

At a step ECSv6''', the server Sv sends at least one notification message MN to the user terminals T1 and T2 regarding the value of the state variable S. For example, in the case where the user Usr2 has not been provided with an access right profile enabling him to visualize the values of the state variable S, only one notification message MN would have been sent to the user terminal T1.

Thus, an event-based supervision mode may be implemented, in which a user is subscribed to some events, for example the change of the values of state variables.

The configuration, monitoring and supervision methods have been described with reference to an execution by a server. Of course, these methods may be implemented by another type of management unit, in particular by a central unit intended to be connected to one or several central control unit(s) on distinct private or local area networks, or still on the same local area network.

The invention claimed is:

1. A multi account configuration method of at least one home automation installation comprising at least one home automation device and at least one central control unit, the method being executed by a management unit connected to the at least one home automation installation or by the at least one central control unit and comprising the following steps:

i. reception of at least one configuration message from a user terminal and/or from the at least one central control unit; the at least one configuration message regarding at least one access attribute of a user to the at least one home automation device of the at least one home installation, wherein the at least one access attribute is defined for each association between a representative entity and the user;

ii. selection of a user profile corresponding to the user, the user profile being recorded by the management unit or the at least one central control unit in a users repository and in the case of an absence of a the user profile in the users repository creation in the users repository of a new user profile corresponding to the user;

iii. selection of a representative entity of the at least one home automation device, the representative entity being recorded by the management unit or the at least one central control unit in a representative entities repository; and in the case of an absence of the representative entity in the representative entities repository, creation in the representative entities repository of a new representative entity of the at least one home automation device, wherein the representative entity is a data structure which represents a home automation device; and iv. selection of an association between the user profile and the representative entity in an associations repository in which instances of associations are recorded by the management unit or the at least one central control unit, update of the at least one access attribute; and in the case of an absence of the association in the associations repository, creation in the association repository of a new association between the user profile and the representative entity, the at least one access attribute being assigned to the new association between the user profile and the representative entity.

2. The configuration method according to claim 1, comprising a first step of creating a first association between at least one first user profile and at least one first representative entity of at least one device, at least one first access attribute being related to the first association and a second step of creating a second association between at least one second user and the at least one first representative entity or a second representative entity comprising at least one device in common with the at least one first representative entity; at least one second access attribute being related to the second association.

3. The configuration method according to claim 2, wherein a validity period is related to the second association, wherein the at least one second access attribute defines a non-exclusive access right for the at least one second user on the at least one device in common during the validity period, and wherein the at least one first access attribute defines a non-exclusive access for the at least one first user profile during the validity period.

4. The configuration method according to claim 3, wherein the at least one second access attribute defines an exclusive access right for the at least one second user on the at least one device in common during the validity period, the at least one first access attribute corresponding to an access prohibition for the at least one first user profile during the validity period.

5. The configuration method according to claim 1, wherein the at least one access attribute comprises at least one of the following elements:
- an ownership flag;
- an installation label;
- an access rights profile; or
- a default installation flag.

6. The configuration method according to claim 5, wherein the access rights profile corresponds to a predefined access right profile and/or to a list of access rights on devices or groups of devices related to a representative entity.

7. The configuration method according to claim 1, further comprising the following steps:
- sending at least one distribution message regarding the creation or the update of at least one association to at least one central control unit belonging to one of multiple home installations corresponding to the representative entity of at least one device concerned by the at least one association.

8. The configuration method according to claim 1, further comprising the following steps:
- determination of a display configuration regarding at least one command on the at least one home automation device which may be triggered by the user and/or at least one state variable of the at least one home automation device which may be visualized by the user according to the at least one access attribute;
- sending at least one display configuration message regarding the display configuration to a user terminal.

9. A monitoring method of multiple home automation installations, the method being executed by a management unit connected to the multiple home automation installations or by a central control unit of each of the multiple home automation installations and comprising the following steps:
   i. reception of a control message originating from a user terminal or an application on the management unit or on another connected management unit, the control message regarding a user and at least one home automation device of the multiple home automation installations;
   ii. selection of a user profile corresponding to the user, the user profile being recorded by the management unit or the central control unit in a users repository;
   iii. selection of a representative entity of the at least one home automation device of the multiple home automation installations, the representative entity being recorded by the management unit or the central control unit in a representative entities repository, wherein the representative entity is a data structure which represents a home automation device;
   iv. selection of an association between the user and the selected representative entity of step iii concerned by the control message, the association being recorded by the management unit or the central control unit in an associations repository, wherein an access attribute is defined for each association between the selected representative entity of step iii and the user;
   v. determination of at least one action to carry out according to the control message and the access attribute related to the association; and
   vi. triggering of the execution of the at least one action if the access attribute defines an authorization of the at least one action; or absence of triggering of the execution of the at least one action if the access attribute defines an absence of authorization of the at least one action, wherein the user is able to manage the multiple home automation installations with a single account.

10. The monitoring method according to claim 9, wherein the reception of the control message corresponds to a request for carrying out a command, a grouped command or the triggering of a scenario originating from the user terminal.

11. The monitoring method according to claim 9, wherein the reception of a control message corresponds to a connection of the user terminal to the management unit or to the central control unit or to the reception of an indication that a connection with the user terminal is established or to an update request by the user terminal; and
   wherein the at least one action to carry out corresponds to sending to the user terminal:
   at least one display configuration message regarding at least one command on at least one home automation device which may be triggered by a user and/or at least one value of a state variable of a home automation device which may be visualized by a user according to the access attribute.

12. The monitoring method according to claim 11, comprising a step of selecting at least one default association for a user connected via the user terminal.

13. The monitoring method according to claim 9, wherein a validity period is related to the association, the access attribute defining an access right during the validity period.

14. The monitoring method according to claim 9, wherein the access attribute comprises at least one of the following elements:
- an ownership flag;
- an installation label;
- an access rights profile; or
- a default installation flag.

15. The monitoring method according to claim 14, wherein the access rights profile corresponds to a predefined access right profile and/or to a list of access rights on devices or groups of devices related to a representative entity.

16. A supervision method of multiple home automation installations, the method being executed by a management unit connected to at least one home automation installation of the multiple home automation installations or by a central control unit of at least one home automation installation of the multiple home automation installations and comprising the following steps:
   i. reception of a state notification message originating from the central control unit containing an indication regarding at least one state variable of a home automation device or an indication regarding the completion of a command;
   ii. selection of a representative entity of the home automation device, the representative entity being recorded by the management unit or the central control unit in a representative entities repository, wherein the representative entity is a data structure which represents the home automation device;
   iii. selection of at least one association between the representative entity and at least one user, the at least one association being recorded by the management unit or the central control unit in an associations repository;
   iv. selection of a profile of the at least one user corresponding to the at least one association, the profile of the at least one user being recorded by the management unit or the central control unit in a users repository;
   v. determination of a notification authorization for the profile according to the state notification message and at least one access attribute related to the at least one association, wherein the at least one access attribute is defined for each association selected in step iii between the representative entity and the at least one user; and vi. sending at least one state notification message to a user terminal held by a user corresponding to the profile of the at least one user regarding the at least one state variable of the home automation device or the completion of the command if the at least one access attribute defines a notification authorization, wherein the user is able to manage multiple home automation installations with a single account.

* * * * *